United States Patent [19]
Habert et al.

[11] 3,844,871
[45] Oct. 29, 1974

[54] TIRE BUILDING MACHINE

[75] Inventors: William C. Habert, Fraser; Wayne Baumgartner, Sr., Royal Oak; Robert J. Brown, Grosse Pointe Farms, all of Mich.

[73] Assignee: Uniroyal, Inc., New York, N.Y.

[22] Filed: Feb. 5, 1973

[21] Appl. No.: 329,947

[52] U.S. Cl............... 156/362, 156/128 I, 156/133, 156/405, 156/406, 156/415, 235/151.1, 235/151.32

[51] Int. Cl...................... B32b 31/00, B29h 17/02

[58] Field of Search.... 156/110, 117, 123, 126–133, 156/394, 396, 400–406, 414–420, 350, 362, 363; 235/151.1, 151.32; 83/152, 154

[56] References Cited
UNITED STATES PATENTS

| | | | |
|---|---|---|---|
| 1,679,560 | 8/1928 | Burdette | 264/291 |
| 2,690,785 | 10/1954 | McWilliams | 156/128 |
| 2,918,105 | 12/1959 | Harris | 156/406 |
| 3,405,023 | 10/1968 | Eckenwiler et al. | 156/415 |
| 3,406,601 | 10/1968 | Clifford | 235/151.32 |
| 3,455,764 | 7/1969 | Bryant | 156/128 |
| 3,537,936 | 11/1970 | Leblond | 156/405 |
| 3,591,439 | 7/1971 | Leblond et al. | 156/406 |
| 3,607,555 | 9/1971 | Leblond et al. | 156/396 |
| 3,654,828 | 4/1972 | Leblond et al. | 83/154 |
| 3,684,877 | 8/1972 | Homa et al. | 156/401 |

FOREIGN PATENTS OR APPLICATIONS
983,349   2/1965   Great Britain...................... 156/144

*Primary Examiner*—Clifton B. Cosby
*Assistant Examiner*—John E. Kittle
*Attorney, Agent, or Firm*—Philip Sands, Esq.

[57] ABSTRACT

An electronically digitally controlled tire building machine having a pair of supply mechanisms for supplying a pair of continuous strips of breaker material of the same or different physical characteristics, a pair of severing devices which sever the strip into strip portions, a pair of transfer mechanisms for transporting the severed strip portions, respectively, to a pair of spaced locations, and a single breaker building drum which is intermittently shiftable along a fixed axis between a number of stopped positions two of which coincide with said spaced locations, respectively. After the breaker plies are built up on the building drum at said pair of spaced locations, a tread applicator mechanism, located at a third one of the stopped positions, applies a strip of tread material around the breaker ply assembly. In another of the stopped positions of the building drum a transfer ring cooperates with the drum for transferring a completed breaker-tread assembly from the building drum onto a carcass supported on a carcass support member.

46 Claims, 22 Drawing Figures

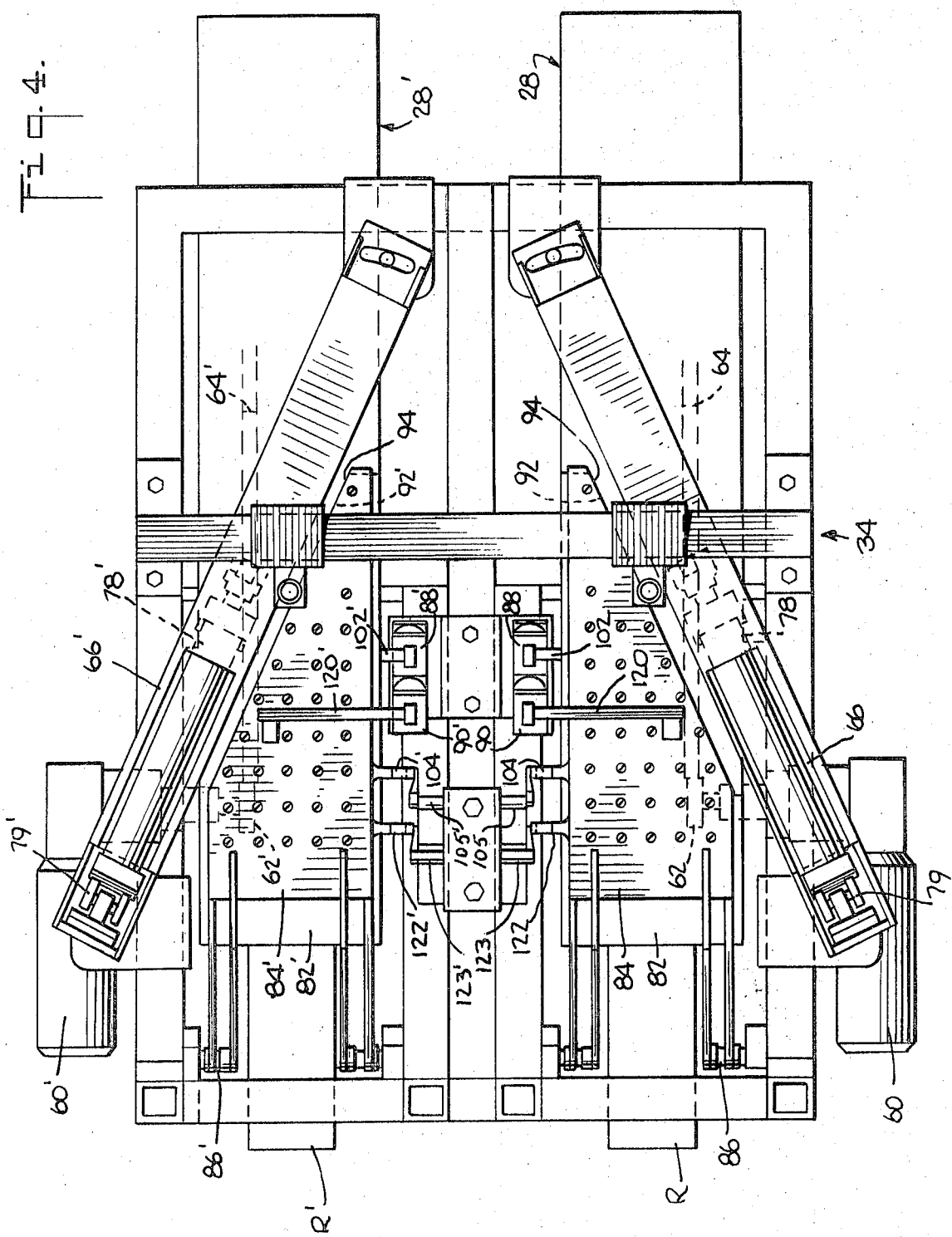

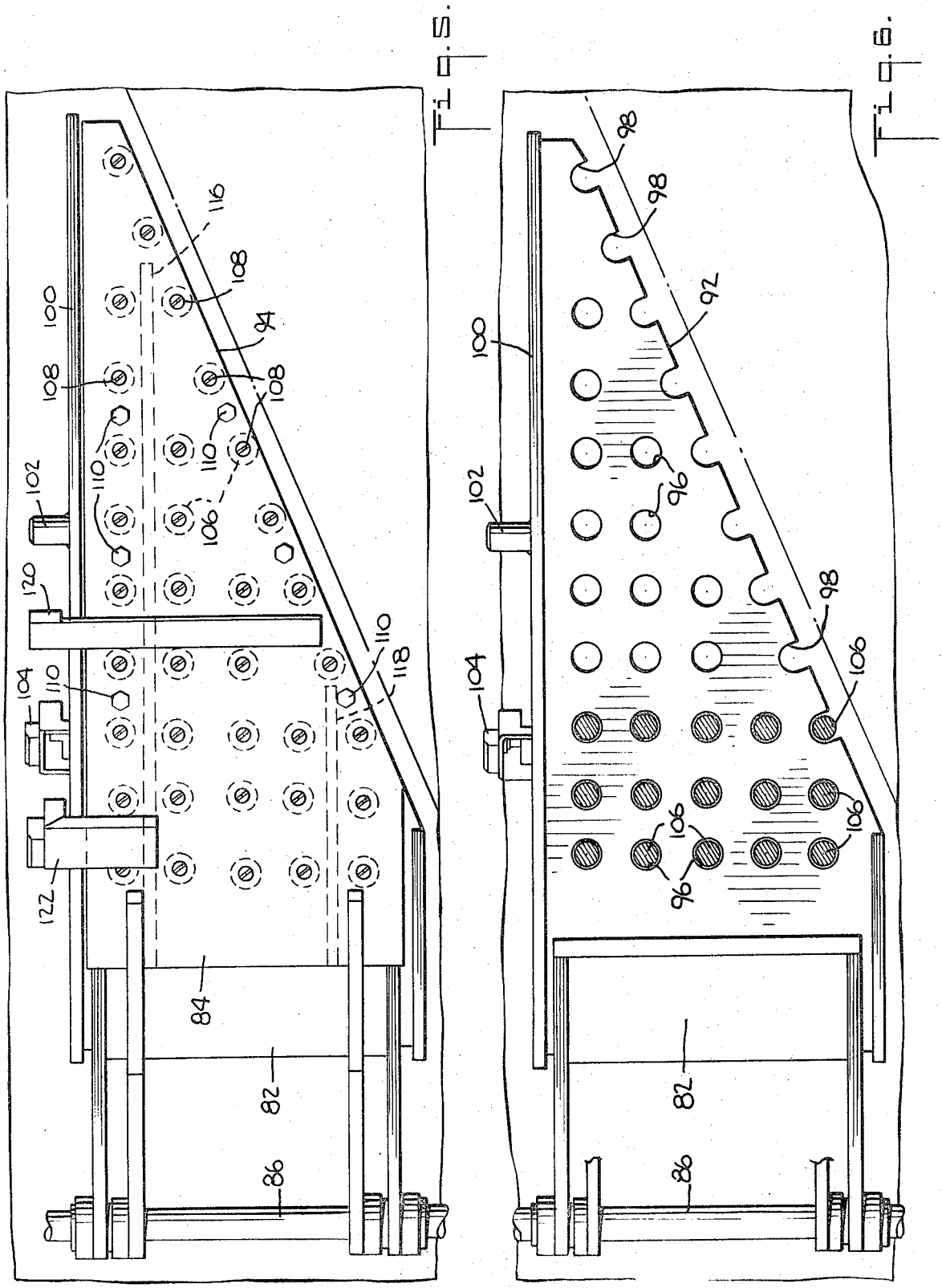

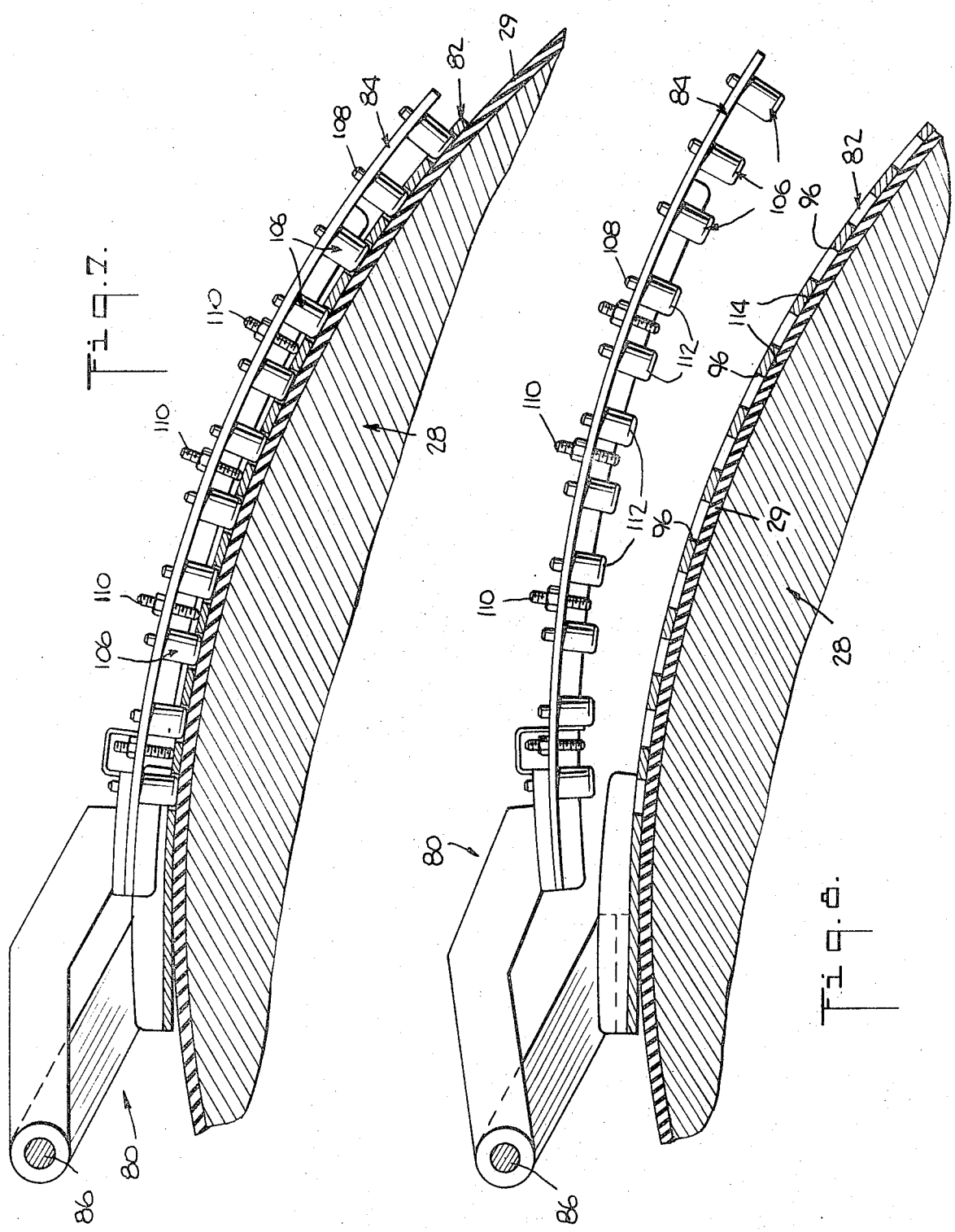

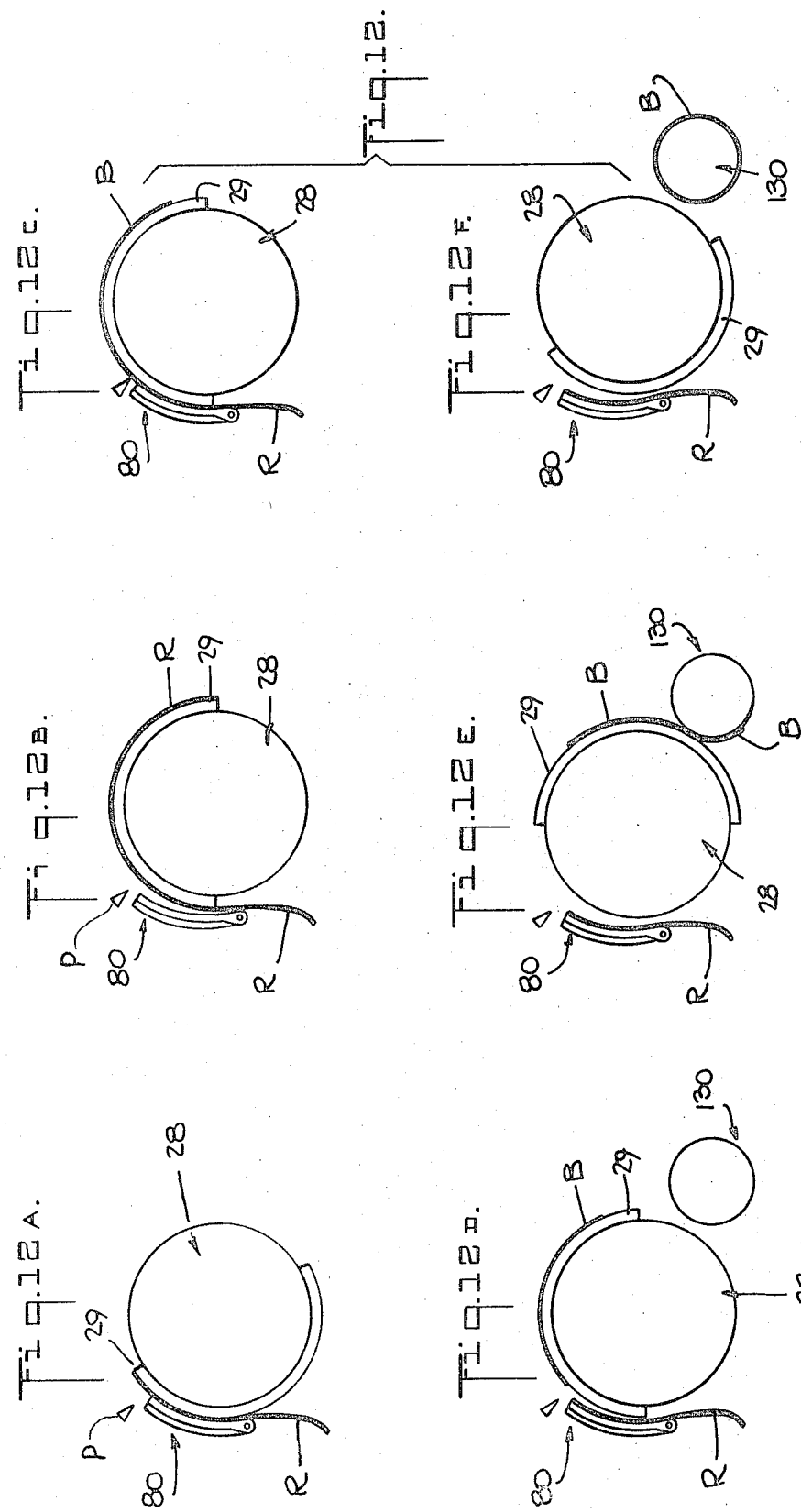

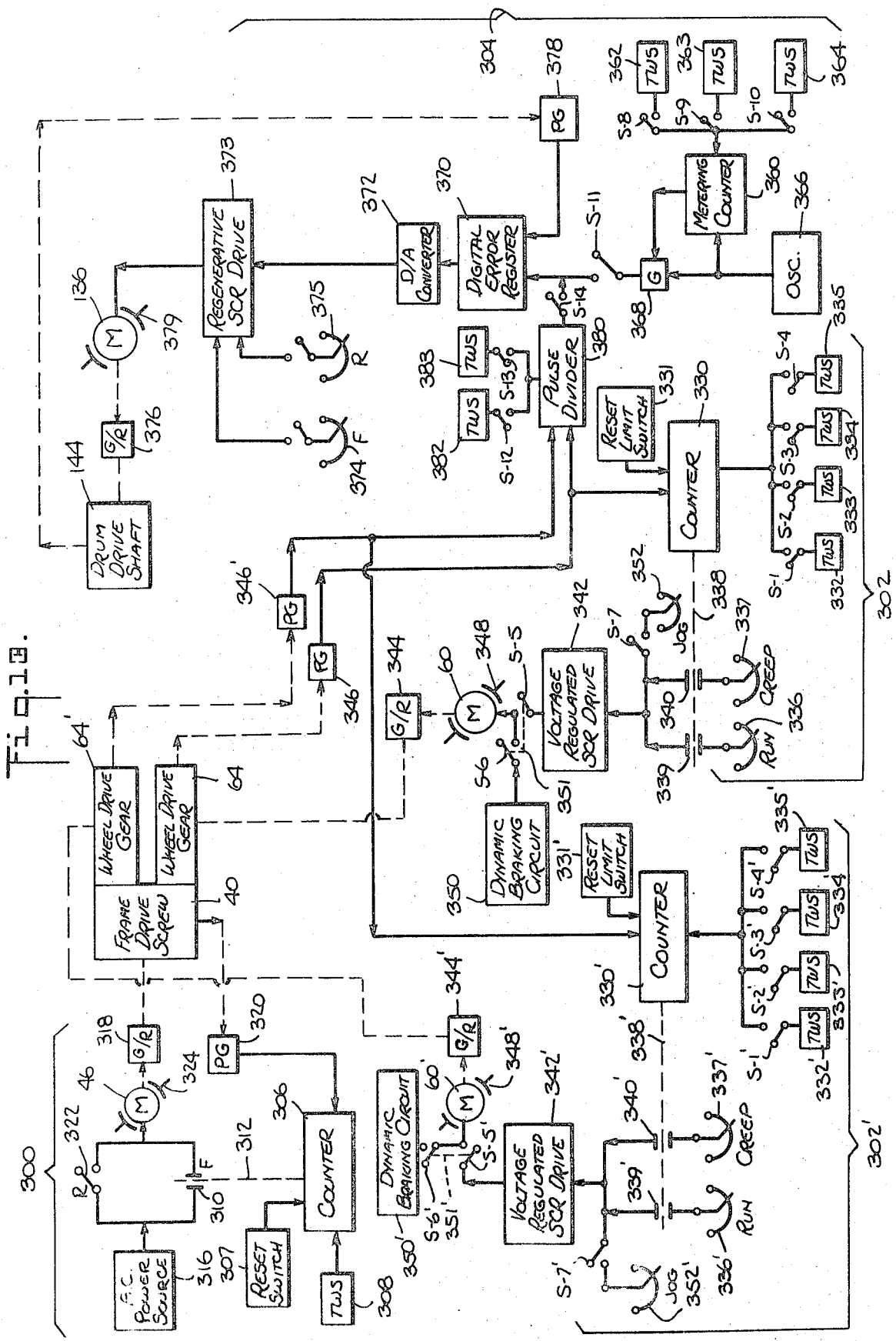

TIRE BUILDING MACHINE

BACKGROUND OF THE INVENTION

This invention relates to an improved tire building machine and, more particularly, to a tire building machine having an improved combination of mechanisms for fabricating breaker plies, assembling said plies into an annular breaker assembly, applying tread material around such breaker assembly, and assembling the resulting breaker-tread assembly with a tire carcass.

In the building of tires having breakers or belts incorporated in the crown area of the tire, as in the case of radial ply, belted tires for example, a two stage process is conventionally employed. During the first stage of tire building, a cylindrical carcass is formed having (a) one or more rubber covered cord plies wound around and interconnecting axially spaced, parallel, coaxial, bead cords and (b) a layer of rubber sidewall stock on each sidewall area of the carcass, intermediate the eventual crown area thereof and the two bead areas thereof. Such a carcass is referred to herein as the "first stage carcass." During the second stage of tire building, the shape of the first stage carcass is changed from a cylinder to a toroid and one or more rubber covered cord breaker plies and a rubber tread slab are added to the crown portion of the carcass to form what is referred to herein as the "second stage carcass." The term "rubber" as used herein is intended to cover natural rubber, man-made rubber and rubbery materials. The term "cord" as used herein is intended to cover single strand and multiple strand, filaments, wires or cables of natural and synthetic textile materials such as cotton, rayon, nylon, polyester, glass fiber and the like, metal and/or such other materials as may be used as reinforcements in pneumatic tires.

A number of machines have heretofore been developed which are utilized in building a first stage carcass for later use in the general process referred to above (see for example, U.S. Pat. No. 3,157,542 to H. W. Trevaskis, dated Nov. 17, 1964 and U.S. Pat. No. 1,938,787 to A. O. Abbott, Jr., dated Dec. 12, 1933). In these machines a number of layers of fabric are assembled together on a cylindrical former for producing a first stage carcass. The arrangements of these machines is such that the former moves from one rotary applicator wheel to the next in order to get oppositely oriented plies applied thereto. In each instance, in addition to axial movement from one applicator wheel to another, the former is moved transversely at each applicator station toward and away from the peripheral surface of each applicator wheel for application of the plies. Inaccuracies as well as added expenses can result from the need for these additional movements.

A number of machines have heretofore also been developed which are utilized in building second stage carcasses in accordance with the general process referred to above (see, e.g., U.S. Pat. No. 3,125,482 to W. Niclas et al., dated Mar. 17, 1964). In such machines, the cylindrical shape of the first stage carcass is changed into the toroidal shape of the second stage carcass on an inflatable drum; breaker-tread assemblies are fabricated by successively winding the various plies of each breaker and the tread layer about a radially expansible and contractible auxiliary building drum; each breaker-tread assembly is then transformed from the outer surface of the auxiliary drum to the inner surface of a radially expansible, contractible, transfer ring which is brought into a position surrounding the breaker-tread assembly; the breaker tread assembly building drum is then contracted to allow movement of the transfer ring with the breaker-tread assembly therein to a position surrounding a carcass on an inflatable drum; the inflatable drum is then expanded and the crown area of the carcass thereon expands into pressurized contact with, and adheres to, the inner surface of the breaker-tread assembly to form the second stage carcass.

Although commercially acceptable tires can be made on the aforesaid known tire machines, the construction of the known apparatus for carrying out the above process is such that many of the operations are carried out sequentially rather than simultaneously resulting in loss of valuable machine time. Furthermore, the layout of the known machines is such as to result, among other things, in inefficient use of factory space. The sequentiality of the operations and/or the application by hand of the breaker plies and treads to the building drum increases the possibility of error in alignment of the components of the work piece, thus frequently resulting in a lack of uniformity of the tires produced by such machines. As noted above, even the constructions which are known for the production of first stage carcasses are not free of substantial risk of misalignment as a result of the required transverse movements of the former with respect to each of the rotary applicator wheels in addition to the axial shifting of the former from one applicator wheel to the next.

A significant advancement in the art of tire building was made with the development of the tire building machine disclosed in U.S. Pat. No. 3,591,439 to J. Leblond et al., dated July 6, 1971. This machine carries out a number of tire building operations simultaneously (not merely sequentially) and obviates, for the most part, the necessity for the operator to manually position, adjust or otherwise operate on the breaker plies and treads. However, the breaker building operation effected by this machine, which involves the cooperation of a pair of breaker applicator wheels with a single breaker building drum, still requires the operator to sequentially activate various mechanism.

Moreover, the relative movements (rotation and indexing) of the wheels and drum of the latter machine are not governed by a system which permits precise control thereover. Limit switches are used for initiating or terminating various operations sequentially. Thus, tires may be built thereupon which may not always be uniform in character and dimension unless the tire building operations are slowed to permit periodic inspection and adjustment of the tire assembly stages, and unless excessive care is maintained and excessive time taken, when readjusting the machine parts between tire building operations.

Another disadvantage associated with the latter and other conventional tire building machines is that they are not versatile and cannot be modified effectively and rapidly to permit building of tires of different sizes. Even those machines having breaker building drums that can be sized (expanded or collapsed) over a substantial range, still require the operator to manually position precisely the periphery of each of the applicator wheels relative to the drum periphery when the size of the latter is to be altered. This, likewise, is time consuming and leaves a margin of human error associated with such machines.

Accordingly, a primary objective of the present invention is to obviate the foregoing disadvantages by providing an improved tire building machine having a digital control system for precisely governing machine part movement.

It is another object of the present invention to porovide a tire building machine which is of enhanced versatile nature, in that the machine can be altered effectively, precisely and rapidly to permit building of tires of different sizes.

It is still another object of the present invention to provide a tire building machine having an electrical control system which is cooperable with a conventional programmable sequential control system for controlling the various machine parts with one another rapidly, precisely, sequentially and simultaneously.

Another object of this invention is to provide a tire building machine having a higher production rate than the presently known tire building machines.

A further object of this invention is to provide a tire building machine capable of producing tires with greater uniformity than the known tire building machines.

Yet another object of this invention is to provide a tire building machine of the above type requiring a minimum amount of factory space.

It is still a further object of this invention to provide a tire building machine capable of simultaneously handling two continuous strips of breaker material of different physical characteristics and/or which are differently oriented with respect to each other.

A concomitant object of the present invention is to provide a machine of the above type in which the loading, assembly, and unloading stations are all readily accessible to a single operator.

Further objects and advantages of this invention will become apparent as the following description proceeds.

SUMMARY OF THE INVENTION

Briefly stated and in accordance with one embodiment of this invention, a tire building machine is provided with (1) a pair of supply means for supplying a pair of chord reinforced continuous strips of bias-cut breaker material which may have the same or different physical characteristics and wherein the cords may be similarly or oppositely oriented with respect to each other, (2) severing means for severing strip portions from each of the continuous strips of breaker material, (3) a pair of spaced breaker applicator wheels for applying the severed strip portions to a single expansible, collapsible, breaker building drum, the latter being shiftable along a fixed axis between a first position in which it is in registry with the first of said breaker applicator wheels, a second position in which it is in registry with the second breaker applicator wheel, and both a third and a fourth position in which it is spaced from both of the wheels, (4) a tread applicator means at said third position for applying a strip of tread material to a breaker assembly built up on the breaker building drum, and (5) a transfer ring cooperable with the breaker building drum when the latter is in the fourth position thereof for transferring a completed breaker-tread assembly from the building drum onto a first-stage carcass supported on a carcass support means.

Preferably, the axis of the carcass support means is inclined with respect to the fixed axis of the building drum. The transfer ring is supported for pivotal movement between a first angular position in which it is coaxial with said fixed axis and a second angular position in which it is coaxial with said carcass support means. The transfer ring is also shiftable on said pivot means along its own axis for removing the completed breaker-tread assembly from the drum and shifting the assembly into association with the carcass.

The machine furthermore comprises an electrical digital control system for selectively effecting an expansion or collapsing of the breaker building drum to permit building of different size breaker-tread assemblies thereon, and for effecting a corresponding amount of radial shifting of the applicator wheels relative to the drum so that the periphery of each wheel is in operative registery with each drum position. The digital control system also governs the rotation of the wheels and drum to effect transferring of a breaker cut-to-length from each wheel to the drum.

BRIEF DESCRIPTION OF THE DRAWINGS

While the specification concludes with claims particularly pointing out and distinctly claiming the subject matter regarded as this invention, it is believed that the invention will be better understood from the following description, taken in connection with the accompanying drawings in which:

FIG. 4 is a top plan view of the breaker applicator wheels of the present invention;

FIG. 5 is an enlarged, top plan view of the magnetic and stripper plates associated with one wheel of the present invention;

FIG. 6 is a view similar to FIG. 5, but only illustrates the stripper plate of the present invention;

FIG. 7 is an enlarged, fragmentary, partially cross-sectional, side elevational view of the magnetic and stripper plates in superposed relation;

FIG. 8 is a view similar to that of FIG. 7 and illustrates the magnetic and stripper plates out of superposed relation with one another;

FIG. 9 is an enlarged, schematic, partially cross-sectional, front elevational view of the breaker-tread assembly building drum and its apertenant structure;

FIG. 10 is a view taken along arrow G in FIG. 9 of the cam plate for radially expanding or contracting the drum periphery;

FIGS. 12A–12F are schematic views of the sequence for effecting a transfer of a leading breaker from one of the breaker wheels to and around the drum; and FIG. 13 is a functional schematic block diagram of the digital control system of the present invention.

DESCRIPTION OF THE PREFERRED EMBODIMENT

Breaker Strip Supply Unit "A"

Figure 1:
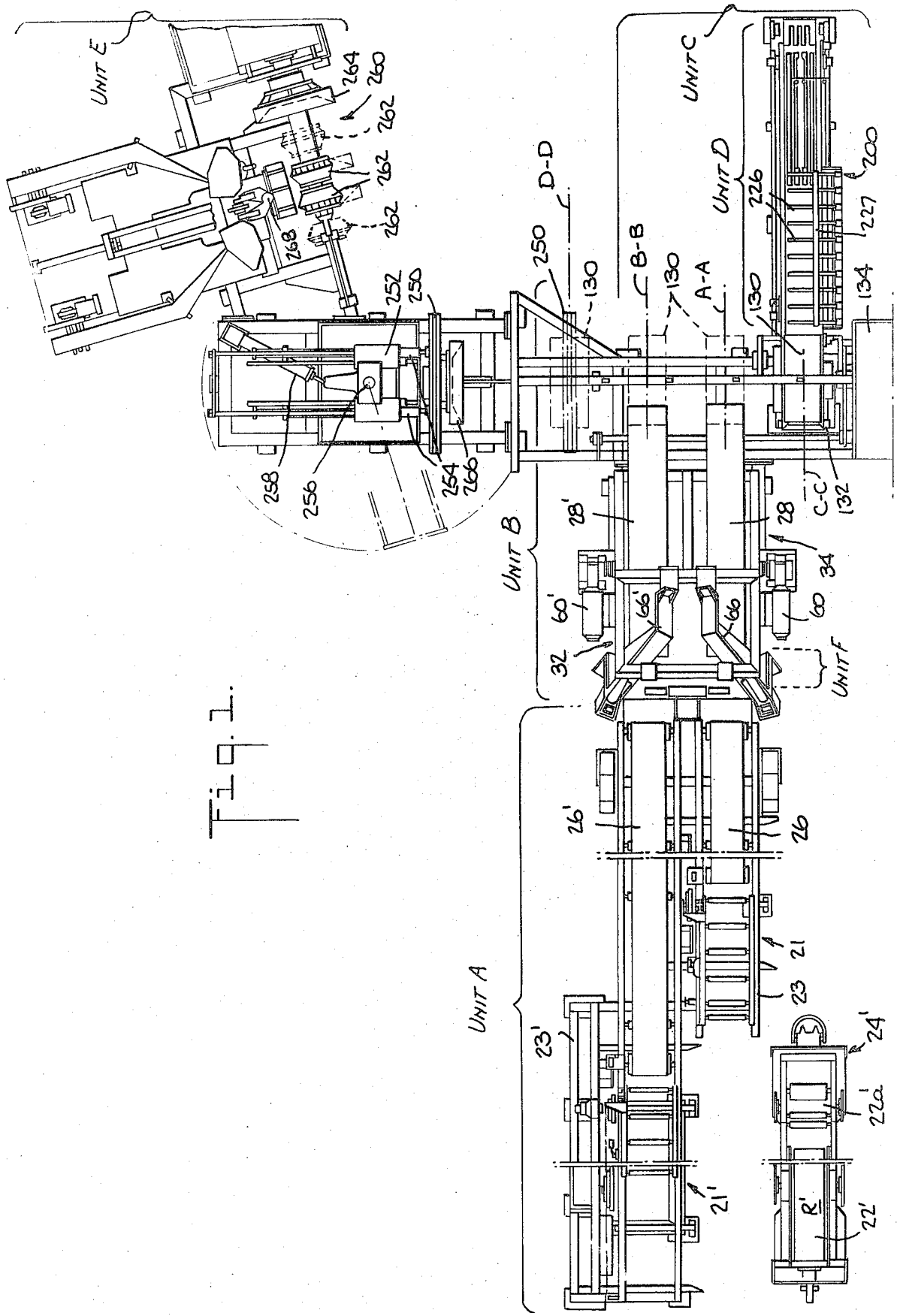
FIG. 1 is a schematically illustrated, top plan view of the machine according to the present invention.
Figure 2:
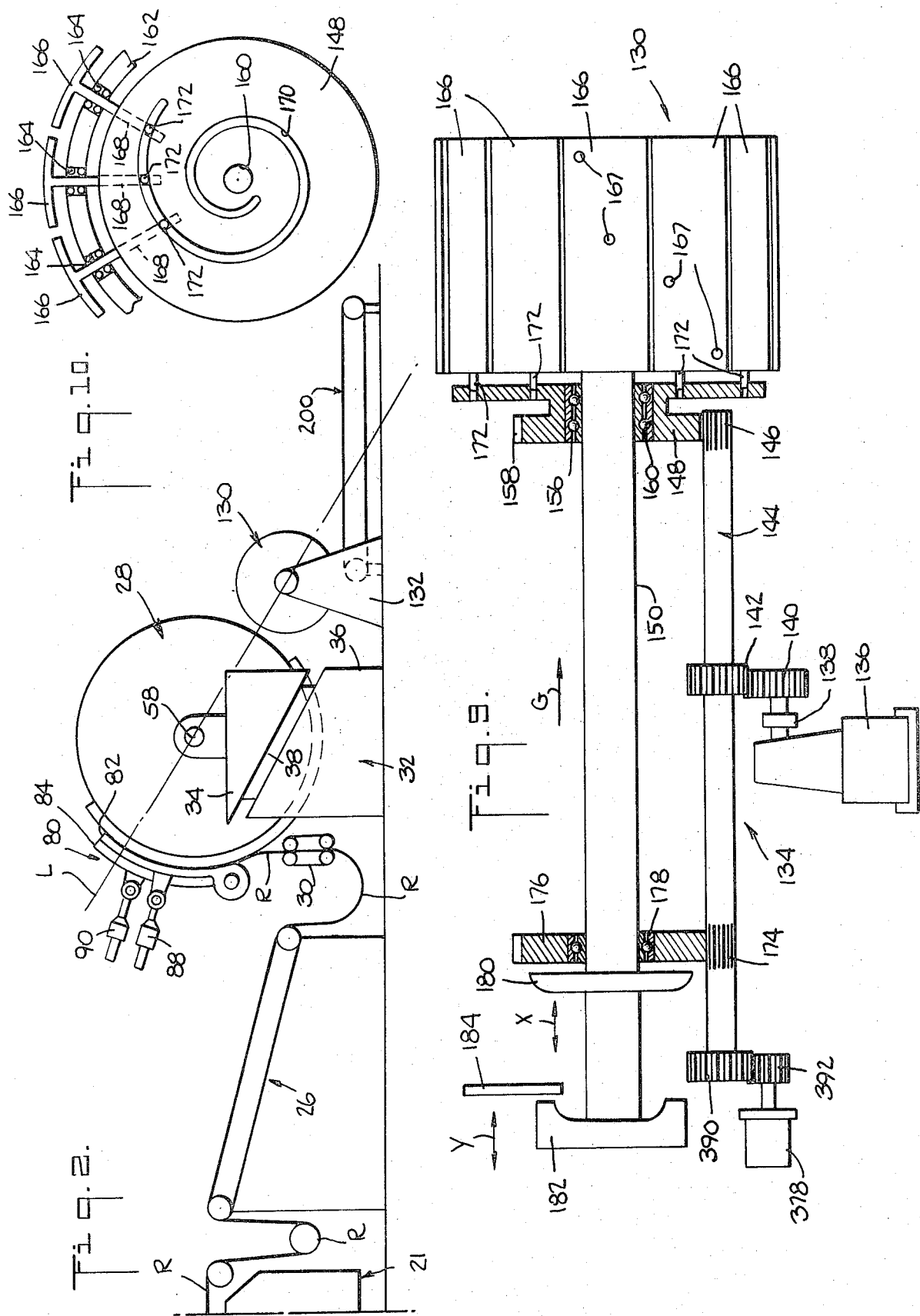
FIG. 2 is a schematically illustrated, side elevational view of the breaker-tread assembly building structure.

Referring to FIGS. 1 and 2, the apparatus according to the present invention includes a unit "A" comprising a pair of supply units 21 and 21' for supplying a pair of continuous strips of preferably magnetically attractable (steel-reinforced) breaker material. The strips which are wound respective on spools, such as spool 22', may have different widths, and possibly the inclinations of their cords with respect to their longitudinal axes may be different. For obvious convenience of reloading, initial winding of the continuous strips on the spools is effected in the same direction on the different spools. Thus, even though it may ultimately be desired to have the strips oriented in opposite directions, the initial winding of the strip material onto their respective spools is done in the same direction, i.e., with respect to those spools, so that as far as the winding operation is concerned the cords of the breaker strips always have the same orientation, irrespective of which of the spools is being wound.

The strip supply units 21 and 21' are each preferably of the type described in U.S. Pat. No. 3,498,555 to J. Leblond et al., dated Mar. 3, 1970. As described in the aforesaid patent, the supply units 21 and 21' each includes an unwinding station defined by stationary frames 23 and 23' on which the drive and control elements of the respective unit is mounted, and with which a movable dolly, such as the dolly 24' is associated. On each of the dollies there is mounted the respective breaker strip supply spools, such as the spool 22', and a respective liner take-up spool, such as the spool 22a'. While the liner material which separates adjacent convolutions of the breaker material on the supply spools is wound on the liner take-up spools, the continuous strips of breaker material may be fed to a pair of transport mechanisms preferably comprising a pair of parallely arranged endless belt conveyors, respectively, 26 and 26' of well known type, the said strip materials resting on the upper runs of the endless belts so as to be transported thereby. When, as is the usual case, it is desired to have the breaker assemblies built up of successive plies whose cords form a crossing angle with respect to each other, the otherwise identical movable dollies such as the dolly 24' are reversed with respect to each other so that the breaker strips are unwound in opposite directions.

It will thus be seen that the strips wound on the supply spools whose median planes A—A and B—B are parallel, are each unwound by the action of the belt conveyors 26 and 26', respectively. The conveyors 26 and 26' deliver the continuous strips to a strip processing Unit "B" comprising a pair of applicator units (wheels) 28 and 28' which fabricate breaker plies, orient the breaker plies in desired fashion, and transfer the oriented breaker plies to a breaker building unit "C" as will be described in more detail hereinbelow.

Adjacent the downstream end of each of the conveyors 26 and 26' there is preferably located a breaker strip centering device (Unit "F") such as, for example, the one described in U.S. Pat. No. 3,537,936 to J. Leblond, dated Nov. 3, 1970. Preferably, each of these centering units includes a first pair of endless belts forming a generally horizontal, moving support surface for supporting the respective material as it passes through the device, and a second pair of driven endless belts forming vertical, horizontally spaced, moving surfaces for contacting and guiding the side edges of the strip material as it passes through the device so as to maintain the continuous strips in registry with their respective median planes. The belts, however, whether they be of the above type or of any other conventional type, such as that disclosed in U.S. Pat. No. 3,547,286, dated Dec. 15, 1970, to J. Leblond, are schematically illustrated in part in FIG. 2 and are denoted by reference character 30.

BREAKER FABRICATING AND TRANSFER UNIT B

Figure 3:
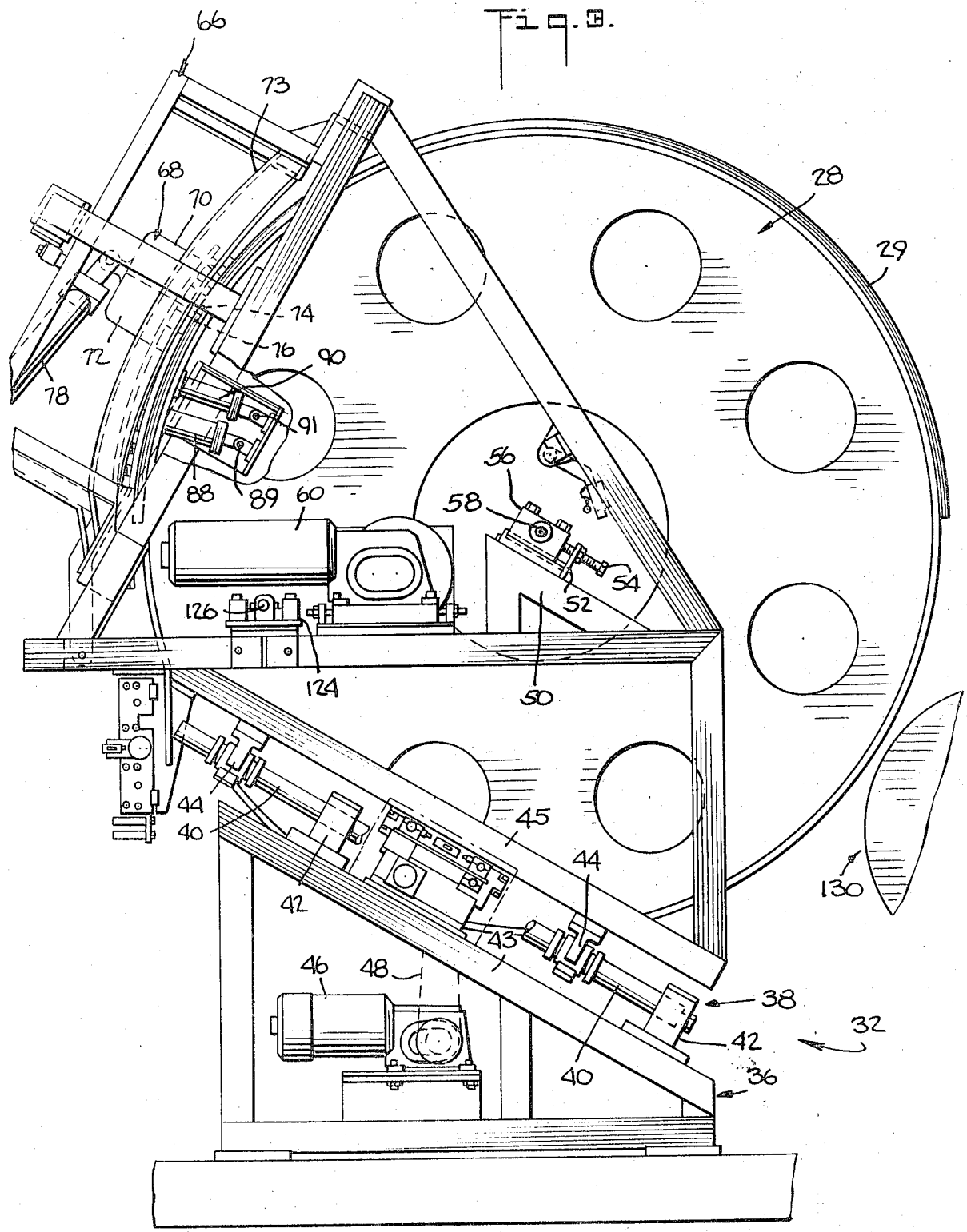
FIG. 3 is an enlarged, side elevational, fragmentary view of one of the breaker-applicator wheels of the present invention.

The Breaker Fabricating and Transfer Unit B comprises the aforementioned pair of wheels 28 and 28', as illustrated in FIGS. 3 and 4. Each of the wheels 28 and 28' is provided with a breaker strip support anvil or band which overlies the periphery of each of the wheels over an arcuate extent of approximately 180°. FIG. 3 illustrates the band associated with the wheel 28, the band being denoted by reference character 29. Each of the wheels 28 and 28' is rotatably mounted upon a common frame 32 having an upper movable frame segment 34 and a lower stationary frame segment 36 relative to which the upper movable frame segment 34 may be shifted.

Between the frame segments 34 and 36 there is interposed a drive means 38 which comprises a threaded shaft (screw) or worm 40 rotatably supported generally at each of the opposite end portions thereof, such as by means of support brackets 42 fastened along the inclined upper portion 43 of the lower frame segment 36. A pair of threaded collars 44, which are affixed to the inclined lower portion 45 of the upper frame segment 34, are threadedly associated with the worm 40 such that when the latter is rotated it will effect a shifting of the upper movable frame segment 34 relative to the lower segment 36. At the base of the lower frame segment 36 there is provided a motor unit 46 which via conventional means (not shown) acts to drive an endless belt 48 which also via conventional means (not shown) is drivingly associated with the worm 40. Accordingly, the motor unit 46, through the intermediary of the endless belt 48, acts to rotate the worm 40 and effect a shifting of the upper frame segment 34 relative to the lower frame segment 36 in a direction parallel to the axis of the worm 40.

Each of the wheels 28 and 28' are substantially identical and provided with apertenances which are likewise substantially identical to one another. Thus, the description of the wheels 28 and 28' and their associated apertenances which will follow hereinbelow will be directed at the wheel 28 and not entirely at the wheel 28'. The illustrative subject matter in the drawings which is denoted by reference characters which are primed (') are indicated to correlate apertenances of the wheel 28' with corresponding apertenances associated with the wheel 28.

Accordingly, the frame 32 is provided with an interior triangular frame portion 50 which rotatably supports each of the wheels 28 and 28'. Mounted upon the triangular frame portion 50 is a bracket 52 having a threadedly adjustable wheel-positioning screw 54 which abuts endwise against a block 56 slidably resting on the bracket 52 and in which is rotatably constrained the wheel axle 58 of the wheel 28. A similar assembly is provided for the wheel 28'. Thus, the wheel-positioning screw 54 may be utilized for shifting the block 56 relative to the bracket 52 to thereby permit further control over the positioning of the wheel 28 (and likewise the wheel 28') independently of the worm 40. In this manner, the wheels 28 and 28' may be adjustably moved out of axial alignment with one another when necessary.

Mounted upon the upper movable frame segment 34 is a motor unit 60 which by conventional means (not shown) acts to rotatably drive a gear 62 (FIG. 4). Mounted upon the wheel 28 is a centrally disposed larger gear 64 which meshes with the gear 62 driven by the motor unit 60. A similar assembly is provided for the wheel 28'. Thus, each of the wheels 28 and 28' may be rotated relative to the frame 32 independently of one another.

Mounted atop of the upper frame segment 34 are a pair of oblique auxiliary frame portion 66 and 66', the obliquity of which frame portions, relative to respective circumferential center lines of the wheels 28 and 28', is best illustrated in FIG. 4. Each of the auxiliary frame portions 66 and 66' carries a respective strip severing means, such as the means 68 illustrated in FIG. 3 which is as associated with the wheel 28. Each strip severing means may be of the type, for example, disclosed in U.S. Pat. No. 3,591,439, dated July 6, 1971, to J. Leblond et al., or more preferably the type disclosed in copending U.S. patent application Ser. No. 202,163 filed on Nov. 26, 1971 by W. C. Habert. The strip severing means 68 generally comprises a pair of carriage sections 70 and 72 which are slidingly supported for movement toward and away from one another along an arcuate track 73 having a radius of curvature which is complimental to the radius of curvature of the wheel 28. The carriage sections 70 and 72 are movable relative to the wheel 28 in a direction parallel to the endwise extent of the oblique auxiliary frame portion 66 illustrated in FIG. 4, and are provided with blades 74 and 76, respectively, which may be protracted and retracted into and out of contact with the anvil 29 for severing a breaker strip in an oblique direction corresponding to the obliquity or angle of bias of the steel cords within the breaker strip.

Each strip severing means is actuated such as by means of a power cylinder or jack 78, such as that illustrated in FIG. 3 which is associated with the wheel 28. Appropriate belts and pulleys, and the like (not shown), are provided which cooperate with the jack 78 and the carriage sections 70 and 72 for effecting separation of the carriage sections, after the blades 74 and 76 have been protracted into contact with the anvil 29, and thereafter for effecting movement of the carriage sections toward one another after blades 74 and 76 have been retracted out of control with the anvil 29. Movement of the carriage sections 70 and 72 away from one another effects cutting of a breaker strip, such as the breaker strip R, whereas movement of the carriage sections 70 and 72 toward one another is effected after the breaker strip has been severed.

Also associated with the auxiliary frame portions 66 and 66' are a pair of breaker strip removal and restoring means 80 and 80', respectively. As best illustrated in FIGS. 5-8 the breaker strip removal and restoring means 80, 80' is provided with a triangular like stripper plate 82, 82' and a triangular like magnetic plate 84, 84', each having a common pivotal support axle 86, 86'. The stripper plate 82 and magnetic plate 84 are substantially identical to the stripper plate 82' and magnetic plate 84', respectively, but differ from the plates 82' and 84' with respect to the obliquity of respective edge portions thereof which conform in direction to that of the obliquity of their associated frame portions 66 and 66'.

As best illustrated in FIG. 3, a power cylinder or jack 88 having a pivotal axis 89 is connected to the stripper plate 82, whereas a power cylinder or jack 90 having a pivotal axis 91 is connected to the magnetic plate 84. A similar arrangement of jacks 88' and 90' are associated with the stripper plate 82' and magnetic plate 84', as best illustrated in FIG. 4. The jacks 88 and 90, and likewise the jacks 88' and 90 ' may be actuated manually or automatically by conventional means (not shown) for effecting pivotal movement of the stripper plate 82 and magnetic plate 84 independently of one another (into and out of superposed relation) or in unison (in superposed relation).

The stripper plate 82 and magnetic plate 84 have respective oblique edges 92 and 94, which as discussed above, extend in the direction of the obliquity of the auxiliary frame portion 66. The stripper plate 82' and the magnetic plate 84' are likewise provided with oblique edges 92' and 94', respectively, which extend in the direction of the obliquity of the auxiliary frame portion 66'. The stripper plate 82 is provided with a plurality of circular apertures 96 (FIG. 6) along the facial portion thereof, and is provided along the oblique edge 92 thereof with semi-circular notches 98. A reinforcing edge bar 100 extends along, and is fastened to, the opposite edge of the stripper plate 82. The bar 100 acts to support a cylindrical projection or nub 102 which is pivotally associated with the jack 88 for effecting pivotal movement of the stripper plate 82 relative to the axle 86 thereof. The reinforcing edge bar 100 likewise supports a projection 104 for activating the limit switch 105 (FIG. 4) for purposes as will be described below. The stripper plate 82' is provided with similar structure.

The magnetic plate 84 is provided with a plurality of permanent magnets 106 which extend along the underside thereof, and, as best illustrated in FIGS. 7 and 8, are secured thereto as by means of screws 108. Moreover, there are pivoted a plurality of threadedly adjustable screws 110 for purposes of permitting adjustment of the extent of projection of each of the magnets 106 into and through respective of the apertures 96 of the stripper plate 82 so that bottom surfaces of the magnets 106 will uniformly project preferably up to and not beyond the bottom surface 114 of the stripper plate 82 in a manner illustrated in FIG. 7. A reinforcing rib 116 (FIG. 5) and a shorter reinforcing rib 118 extend along the underside of the magnetic plate 84 to enhance the rigidity of the latter. An elongate bar 120 is fastened to the upper surface of the magnetic plate 84 and is pivotally associated with the jack 90 to effect pivotal movement of the magnetic plate relative to the axle 86 thereof. A projection 122 is affixed to the magnetic plate 84 for association with a limit switch 123 (FIG. 4) for purposes as will be clarified below. The magnetic plate 84' is provided with similar structure.

A pair of locking pin control units are mounted on the upper movable frame segment 34 and are associated with the wheels 28 and 28' respectively. Only one of the locking pin control units is shown, such as that illustrated in FIG. 3, namely unit 124 which is associated with the wheel 28. The unit 124 is provided with a locking pin 126 which is shiftable endwise in a direction parallel to, but offset from, the axis of rotation of the wheel 28 into and out of the confines of a corresponding receptacle (not shown) provided in the wheel 28 at a predetermined position on the latter which is also offset relative to the axis of rotation thereof. The locking pin control unit 124 may be a conventional solenoid-actuated system for cyclically shifting the locking pin 126 into and out of the receptacle in the wheel 28 every 360° of rotation of the latter.

BREAKER-TREAD BUILDING UNIT C

As illustrated in FIGS. 1–3, adjacent the wheels 28 and 28' there is disposed a breaker-tread assembly building drum 130 which is of the type disclosed in copending U.S. Pat. application Ser. No. 329,786, filed on Feb. 5, 1973. The drum 130 is mounted upon a carriage 132 which is intermittently shiftable to effect axial movement of the drum 130 to and from positions defined by the reference median planes denoted by the lines A—A, B—B, C—C and D—D in FIG. 1. An appropriate drive assembly 134 is provided for shifting the carriage 132, and thereby the drum 130, to the intermittent positions aforementioned. As best illustrated in FIGS. 9 and 10, associated with the drum 130 is a motor unit 136 having an output drive gear 140 coupled thereto through the intermediary of a conventional type of clutch 138. Associated with the drive gear 140 is a driven gear 142 which is fixed upon a drum drive shaft 144 such that when the gear 142 is rotated the drum drive shaft 144 will be similarly rotated. The shaft 144 is provided with a toothed end 146 which intermeshes with a toothed periphery 158 of a cam plate 148. The cam plate 148 is freely journaled upon a drum support shaft 150 through the intermediary of a ball bearing assembly 156. The drum support shaft 150, thus, projects through an aperture 160 in the cam plate 148 and at one end is affixed to the drum wall 162 (FIG. 10) such as by conventional means not shown.

The drum wall 162 is provided with a circumferential array of axially extending slotted ball bearing zones 164 through which project, from the interior of the drum wall 162, legs 168 of respective periphery-defining segments 166. The cam plate 148 is provided with a substantially spiral cam groove 170 in which are slidingly constrained follower portions 172 of the respective periphery-defining segments 166.

The drum drive shaft 144 is also provided with a toothed rear portion 174 with which is intermeshed the periphery of a gear 176. The gear 176 is freely journaled upon the drum support shaft 150 for rotation relative thereto through the intermediary of a ball bearing assembly 178. A clutch 180 is provided for selectively coupling the drum support shaft 150 to the gear 176 and is controllably reciprocatable in the direction of arrow X into and out of contact with the side face of the gear 176. At the extreme left end of the drum support shaft 150 there is provided a brake wheel 182 with which is associated a brake shoe 184 or the like, the latter being controllably reciprocatable in the direction of arrow Y into and out of contact with the brake wheel 182.

Accordingly, when the drum drive shaft 144 is rotated, it effects rotation of the cam plate 148. When the brake shoe 184 is in contact with the brake wheel 182, the drum support shaft 150 will be prevented from rotating (the clutch 180 in this instance being out of contact with the side face of the gear 176). Rotation of the cam plate 148, and thereby the spiral groove 170, will effect radial movement of the periphery-defining segments 166 selectively toward or away from the axis of rotation of the drum wall 162. The direction of radial shift of the periphery-defining segments 166 depends upon the direction of rotation of the cam plate 148 and, thus, the latter permits controlling the size of the circumference of the drum 130.

When the brake shoe 184 is removed from the side face of the brake wheel 182, and the clutch 180 is brought into engagement with the gear 176, rotation of the drum drive shaft 144 will effect simultaneous rotation of the drum support shaft 150 and the cam plate 148, thereby resulting in rotation of the drum 130 without the latter undergoing a change in peripherial dimension.

TREAD APPLICATING UNIT D

Referring now to FIGS. 1 and 11A–11E, disposed along the plane denoted by line C—C in FIG. 1, and adjacent one of the positions into which the drum 130 is intermittently shiftable, is a tread applicator unit 200 of the type for example disclosed in U.S. Pat. application No. 325,693, filed on Jan. 22, 1973. The tread applicator unit 200 includes a horizontal frame bar 202 which is pivotally arranged at one end thereof on an upstanding base portion 204. The frame bar 202 at its opposite end is pivotally associated with a vertically extending pivotal power cylinder or jack 206 which when actuated will lift that end of the frame bar 202 associated therewith and tilt it relative to the base portion 204 in a manner generally illustrated in FIG. 11E.

A plurality (only one is shown) of endless belts 208 are arranged on the frame bar 202 and are spaced from one another horizontally through appropriate spaces provided in the frame bar 202. The endless belts 208 are associated with respective pairs of pulleys 210 located at each of the opposite ends of the frame bar 202, the pulleys 210 providing means for driving the endless belts 208 such that the latter may advance a tread, such as the tread T, toward the breaker tread assembly building drum 130. An auxiliary frame 212 is supported by the horizontal frame bar 202 and is vertically shiftable relative to the latter such as by means of power cylinders or jacks 214.

In this respect, the auxiliary frame 212 includes frame portion 216 with which are associated the respective pistons of the jacks 214, the cylinders of the jacks 214 at the opposite end thereof being affixed to the horizontal frame bar 202. Thus, when the respective pistons of the jacks 216 are retracted the entire auxiliary frame 212 is elevated. Elevation of the auxiliary frame 212 will result in the elevation of a plurality of plates or fingers 218 spaced longitudinally along the horizontal frame bar 202 and laterally of the latter between the endless belts 208. When the fingers 218 are elevated they cooperatively lift the tread T lying on the upper runs of the endless belts 208 off the upper runs for purposes for permitting selective stretching or contracting the lengthwise extent of the tread T. The reason for stretching or contracting the lengthwise extent of the tread T is that the lengthwise extent of the tread T must precisely match the outer circumferential extent of a breaker assembly wound upon the drum 130.

Figure 11A:
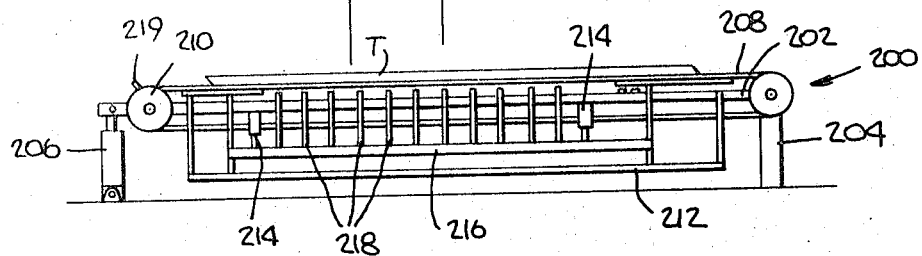
FIGS. 11A–11E are sequential, side elevational, schematic views of the tread applicator unit for stretching or contracting a tread.
Figure 11B:
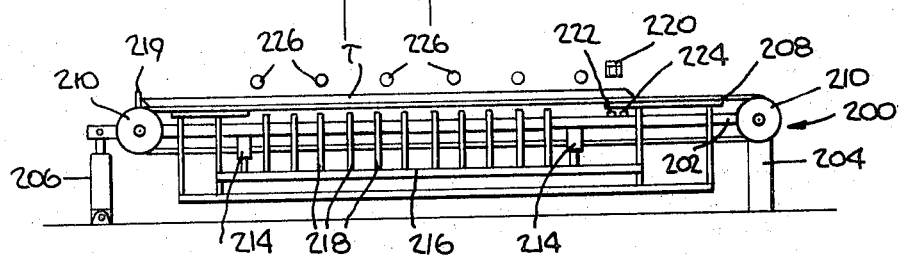
Figure 11C:
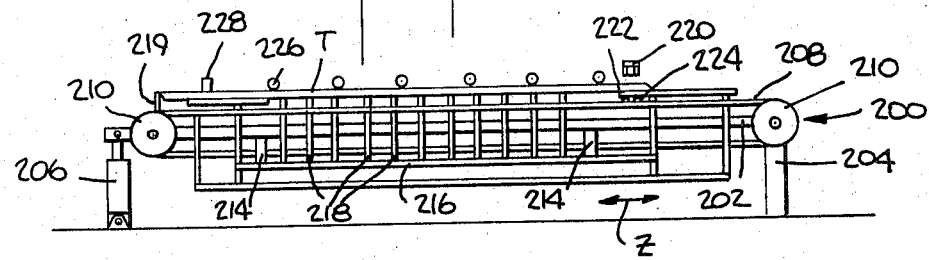
Figure 11D:
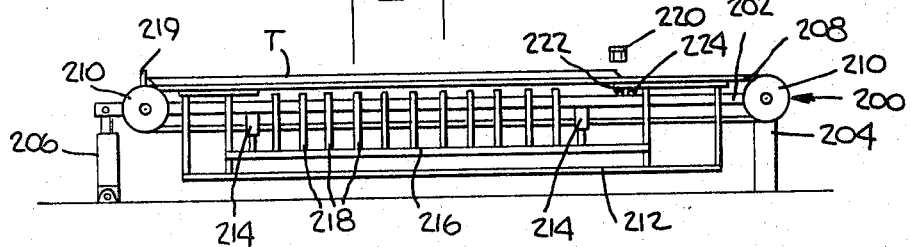
Figure 11E:
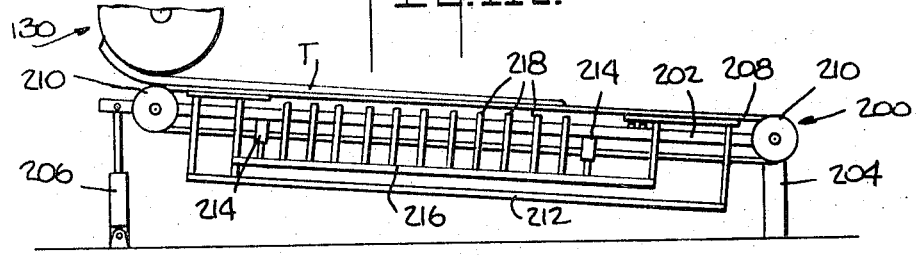

Accordingly, whenever a tread T is initially placed upon the upper runs of the endless belts 208, a tread sensor and limit switching means 219 at the left end of the horizontal frame bar 202 is moved (rotated) from a position illustrated in FIG. 11A to a position illustrated in FIG. 11B. The limit switching means 219 is moved as aforementioned either manually or by automatic means (relays and the like) which is conventional in nature. Likewise, a light source 220 may be moved into position above the tread T as illustrated in FIG. 11B, either manually or by conventional automatic means. The light source 220 is to be disposed above a pair of closely spaced photocells 222 and 224 which may, for example, be supported on the horizontal frame bar 202. The spacing between the photocells 222 anad 224 may for example be approximately 1/32 inch. As the tread T is moved toward the drum 130 by the endless belts 208, the leading edge of the tread T is brought into contact with the limit switching means 219. The limit switching means 219 is operatively coupled to conventional means (not shown) for actuating the jacks 214.

If the length of the tread T is of proper extent, namely the leading edge is in contact with the means 219 and the trailing end thereof blocks the photocell 222, but not the photocell 224, then by conventional switching means, the jack 206 may be actuated. Once actuated, the jack 206 will effect lifting of the left end of the horizontal frame bar 202 such that the leading edge of the tread T is brought into contact with the drum 130 to permit the tread T to be wound upon a breaker assembly previously wound or built up upon the drum 130. However, if the length of the tread T is greater than it should be, namely the trailing edge thereof blocks both photocells 222 and 224 from the light source 220, then by the appropriate conventional switching means, the jacks 214 will be activated to effect elevation of the auxiliary frame 212 and thereby the elevation of the fingers 218. The fingers 218 will act to lift the tread T off the upper runs of the endless belts 208 until the upper surface of the tread T contacts the underside of a plurality of idler rollers 226 positionable in unison in a manner akin to a quadratic linkage assembly either across the tread T (as illustrated in FIG. 1), when the tread T is to be stretched or contracted, or out of the vicinity of the upper surface of the tread T, when the tread T is of correct length.

Thus, when the tread T is too long, the rollers 226 are positioned such that they extend laterally across and above the upper portion of the tread T and act to press downwardly thereagainst when the fingers 218 elevate the tread T off the upper runs of the endless belts 208. Thereafter, by conventional means (not shown), the entire auxiliary frame 212 is shifted to the left thereby moving each of the fingers 218 an equal increment to the left to effect a contraction of the tread T. The fingers are maintained in movable spaced relation with one another lengthwise of the horizontal frame bar 202 by respective helical springs (not shown) interposed between each of the fingers 218. In order to secure the tread T against movement to the left when the auxiliary frame 212 is shifted to the left (arrow Z in FIG. 11C) there is provided a clamp unit 228 which can be brought into contact with the leading edge portion of the tread T either manually or by automatic convention means such as relays and the like (not shown).

Once the tread T has been contracted to the point wherein light issuing from the light source 220 reaches the photocell 224, but not the photocell 22, the jacks 214 are again actuated so that the pistons thereof are protracted to effect the descent of the auxiliary frame 212 thereby permitting the tread T to again rest upon the upper runs of the endless belts 208. Thereafter, the rollers 226 are shifted out of the vicinity of the upper portion of the tread T, such as by means of a common roller shift bar 227 illustrated in FIG. 1.

When the tread T is too short, namely its lengthwise extent is less then the circumferential extent of a breaker assembly previously wound on the drum 130, the procedure is repeated, but in this instance the fingers 218 are reversably shifted to the right so as to lengthen the extent of the tread T. When the tread T is too short the light issuing from the light source 220 will be received by both of the photocells 222 and 224 thereby signalling the reverse operation for stretching the tread T to its proper length.

During a transfer of a tread T from the tread applicator 200 to the drum 130, the clutch 130 disposed between the drive gear 140 and the drive unit 136 of the drum 130 is operated so as to decouple the drive gear 140 from the drive motor 136. This will permit the drum 130 to rotate freely about in support shaft 150. It is the forward movement of the tread T as generated by the moving endless belts 208 that effects rotation of the drum 130 as the tread T is wound upon the latter. Once the tread T has been wound upon the breaker assembly previously wound upon the drum 130, the drum 130 is then shifted axially from the position denoted by the line C—C in FIG. 1 to a position denoted by the line D—D in FIG. 1 corresponding to a breaker-tread assembly transfering position.

THE FIRST STAGE CARCASS ASSEMBLY UNIT E

Referring again to FIG. 1, there is illustrated a first stage carcass assembly unit of the type disclosed, for example, in U.S. Pat. No. 3,676,262 to J. Leblond, dated July 11, 1972. The unit E includes a transfer ring 250 having a radially expansible, contractable, internal effective periphery (not shown) which when fully expanded is of greater circumference than the breaker-tread assembly wound upon the drum 130, and when contracted will engage the breaker-tread assembly wound upon the drum 130 to remove and transfer the breaker-tread assembly to and around a first stage carcass.

In this respect, the transfer ring 250 is mounted upon a turret 252 which when in a position illustrated in solid line in FIG. 1 maintains the transfer ring 250 in coaxial alignment with that of the drum 130. When the drum 130 supplied with the breaker-tread assembly is shifted to a position illustrated in FIG. 1 and denoted by the line D—D, the transfer ring 250, in its expanded condition, is shifted axially from the position illustrated in solid line to that of the position illustrated in phantom corresponding to the line D—D in FIG. 1 so as to surround the breaker-tread assembly. Axial shifting of the transfer ring 250 is effected such as by means of the power cylinders or jacks 254.

When the transfer ring 250 is moved into surrounding relation about the breaker-tread assembly, the transfer ring 250 is radially contracted so as to grasp the periphery of the exposed tread. Thereafter, the drum 130 is radially collapsed such as by means of an inward radial shifting of the periphery-defining segments 166 thereof upon rotation of the cam plate 148. The degree of collapse of the drum 130 is only slight but is sufficient, however, to permit the transfer ring 250 to effect removal of the breaker-tread assembly therefrom when the jacks 254 are retracted. Thereafter, the turret 252 is turned about its axis 256, such as by means of a jack 258, from the position wherein it is coaxially aligned with the drum 130 to a position in coaxial alignment with a first stage carcass support assembly 260.

The first stage carcass support assembly 260 includes a pair of chucks 262 of the type, for example, disclosed in the aforementioned U.S. Pat. No. 3,676,262 or in copending U.S. Pat. application No. 333,265, filed Feb. 16, 1973. The chucks 262 are coaxially arranged with one another for movement toward and away from one another. The chucks 262, when moved from a position illustrated in phantom in FIG. 1 to a position in close proximity with one another and illustrated in solid line in FIG. 1, act to engage respective ones of the opposite carcass beads and move the beads toward one another thereby changing the configuration of the first stage carcass from that of a substantially cylindrical configuration to that of a toroid. During this period, the first stage carcass is inflated by a bladder assembly (not shown) and shaped by a pair of coaxially alignable carcass shaping rings, such as a ring 264 mounted on the first stage carcass support assembly 260 and a ring 266 mounted upon the turret 252. Upon inflation of the first stage carcass, the exterior of the latter will engage the interior of the breaker-tread assembly constrained within the confines of the transfer ring 250 and will adhere thereto. Thereafter, transfer ring 250 is removed from the vicinity of the chucks 262 and a conventional tread stitching mechanism 268 is actuated so as to stitch or effect adhesion of the breaker-tread assembly to the first stage carcass.

ELECTRONIC CONTROL SYSTEM

Operatively associated with the aforementioned units A-F, is an electronic control system which is provided for controlling the operations of the machine of the present invention. In this respect, the electronic control system generally comprises a power supply of A.C. and D.C. nature, a programmable controller and a digital control system having various pulse-responsive counters and other associated equipment.

Generally speaking, the programmable controller acts to control the operative sequence of the machine. The programmable controller comprises various input means for receiving intelligence from sources such as push buttons, limit switches, contact closures, and associated digital and analog equipment, programmable decision-making means in the form of a computer memory, and output means capable of energizing and de-energizing various solenoids, motor starters and relays which are associated either directly or indirectly with the digital and analog equipment. The programmable controller acts to recognize signals from push buttons to selectively start or interrupt various sequences, signals from limit switches which indicate various positions of the machine components, and signals from contact closures associated with the digital and analog equipment which indicate the status or condition of the motor drives and pulse counters, etc. The controller is programmed to make decisions depending upon the condition of the input intelligence thereto, and acts to selectively energize or de-energize the machine drives and prime movers as required by an associated software program. Preferably, the controller is of conventional nature and is of the type, for example, manufactured by the Reliance Electric Company in Cleveland, Ohio, and designated as a "Reliance Automate 33 Programmable Controller."

The digital control system, as schematically illustrated functionally in FIG. 13, is operatively coupled with the programmable controller and the power supply by conventional means in a manner well understood by artisans skilled in the art. Thus, there is omitted from the description herein and drawings the particular arrangement by which the digital control system is electrically coupled with the programmable controller, the power supply and certain other conventional equipment of the machine.

Referring now to FIG. 13, the digital control system generally comprises a frame-positioning unit 300, a pair of applicator wheel control units 302 and 302', and a breaker-building drum control unit 304. The frame-positioning unit 300 generally comprises a conventional pulse counter 306 which is preferably of bidirectional, count-up nature. Electrically coupled with the counter 306 is a reset switch 307 for resetting the counter when necessary to a particular reference level. Moreover, a thumb-wheel switch 308 is electrically coupled with the counter 306 for purposes of selectively storing in the latter a particular count level up to which the counter is to count pulses.

In this respect, a forward motor-starting switch (F) 310, through the intermediary of a conventional relay means 312, is operatively associated with the counter 306 for activating the frame motor 46, the latter which is mechanically coupled to a gear reducer 318. The motor 46 is preferably a three-phase A.C. motor and derives energy from an A.C. power source 316. The frame drive screw 40 is mechanically coupled with a pulse generator 320, the latter which is preferably a conventional photoelectric digital tachometer generator and acts to feed pulses to the counter 306 as the frame drive screw 40 rotates to elevate the frame 34 and the wheels 28 and 28' relative to the drum 130. Also associated with the motor 46 is a reverse motor-starting switch (R) 322 for effecting reverse rotation of the motor 46 and, thereby, rotation of the frame drive screw 40 in an opposite direstion so as to move the frame 34 and the wheels 28 and 28' downwardly relative to the drum 130. A mechanical A.C. friction brake 324 is operatively associated with the motor 46 so as to effect stopping of the latter at prescribed time intervals.

The wheel control units 302 and 302' are identical to one another and, therefore, only the unit 302 will be described herein. The primed (') reference characters in FIG. 13 which are associated with the unit 302' are related to corresponding unprimed reference characters associated with the equipment of the unit 302. Accordingly, the unit 302 is provided with a conventional pulse counter 330 which is preferably of bi-directional, count-down nature and has associated therewith a reset limit switch 331 for resetting the counter 330 when necessary to a particular reference level. Electrically coupled with the counter 330 are at least three thumb-wheel switches 332, 333 and 334 which can be manually set for purposes of storing into the counter 330 respective reference counts, each for effecting a different operation. The thumb-wheel switches 332, 333 and 334 have respective on-off switches S-1, S-2 and S-3 which when closed permit selective ones of the thumb-wheel switches 332, 333 and 334 to reference the counter 330. Moreover, a fourth thumb-wheel switch 335 and an associated on-off switch S-4 may likewise be provided for permitting referencing the counter 330 for a further operation. However, the thumb-wheel switch 335 may be replaced by a conventional switching means (not shown) which is within the cabinet (not shown) of the counter 330 and is of preset nature in that it is not periodically altered manually as are the thumb-wheel switches 332, 333 and 334.

A run potentiometer 336 and a creep potentiometer 337 are associated with the counter 330 through the intermediary of a conventional mechanical relay, the latter being mechanically coupled with respective switches 339 and 340 of the potentiometers 336 and 337. Electrically coupled with the potentiometers 336 and 337 is a conventional voltage regulated SCR drive 342 for driving the motor 60 of the wheel 28. The motor 60 is mechanically coupled with a gear reducer 344, the latter which is likewise mechanically coupled with the wheel drive gear 64 of the wheel 28. The gear 64 is mechanically coupled with a pulse generator 346, the latter which is preferably a conventional photoelectric digital tachometer generator and is electrically coupled with the counter 330 for feeding pulses to the latter upon rotation of the wheel 28. An A.C. friction brake 348 is associated with the motor 60 for effecting stopping of the latter at prescribed intervals.

Moreover, a conventional resisterized dynamic braking circuit 350 is electrically coupled with the motor 60 for effecting stopping of the latter independently of the A.C. friction brake 348. An on-off switch S-5 is interposed between the SCR drive 342 and motor 60, whereas an on-off switch S-6 is interposed between the dynamic braking circuit 350 and motor 60. The switches S-5 and S-6 are mechanically coupled with one another through the intermediary of a common bar or member 351 such that when one of these switches is closed the other one is open, and vice versa. A manually controlled jog potentiometer 352, through the intermediary of an on-off switch S-7, is likewise associated with the SCR drive 342 for permitting control over the rotation of the wheel 28 manually or independently of the counter 330.

The drum control unit 304 includes a conventional metering counter with which are associated three thumb-wheel switches 362, 363 and 364 for purposes of referencing the metering count 360 with respective reference counts. On-off switches S-8, S-9 and S-10 are associated with the aforementioned thumb-wheel switches, respectively. A conventional pulse-generating oscillator, for example a crystal oscillator 366, is electrically coupled with the metering counter 360 and a gate 368, the gate 368 likewise being electrically coupled with the oscillator 366. A conventional digital error register 370, through the intermediary of an on-off switch S-11, is electrically coupled with the gate 368 such that when the switch S-11 is in a closed position and the gate is opened by the metering counter 360 a prescribed quantity of pulses will be fed or "batched" into the digital error register 370 from the oscillator 366.

A conventional digital-to-analog converter 372 is electrically coupled with the digital error register 370 for purposes of converting the output digital pulses from the register 370 to an analog signal. Electrically coupled with the converter 372 is a conventional regenerative SCR drive 373 for purposes of driving the drum drive-shaft motor 136. The regenerative SCR drive 373 may also be controlled by a forward jog potentiometer (F) 374 and a reverse jog potentiometer (R) 375, independently of the register 370. The motor 136 is mechanically coupled with a gear reducer 376, the latter which is mechanically coupled with the drum drive shaft 144. Furthermore, mechanically coupled with the drum drive shaft 144 is a conventional pulse generator 378, which is preferably a photoelectric, bi-directional, digital, tachometer generator and acts to feed pulses to the register 370 as the drum drive shaft 144 rotates. An A.C. friction brake 379 is coupled with the drum motor 136 for purposes of stopping the latter at prescribed intervals.

A conventional pulse divider 380 is electrically coupled with, and interposed between, the pulse generator 346 of the wheel control unit 302 and the digital error register 370 of the drum control unit 304. A pair of thumb-wheel switches 382 and 383, through the intermediary of respective on-off switches S-12 and S-13, are electrically coupled with the pulse divider 380 for purposes of permitting referencing the pulse divider 380 in a manner as will be described below. The switches 382 and 383 are associated with the wheels 28 and 28' respectively. An on-off switch S-14 is interposed between the pulse divider 380 and register 370 for purposes of permitting the pulse divider 380 to pass pulses from the pulse generator 346 to the register 370 as the wheel 28 rotates over prescribed intervals. It should be understood, that the various switches S-1 through S-14 may be manually operated. However, pursuant to the preferred embodiment of the present invention, the aforementioned switches and equipment of the units 300, 302, 302' and 304 are to be sequentially governed by the programmable controller through appropriate relays and the like in a conventional manner not illustrated in the drawings.

OPERATION OF THE MACHINE

In operation, as illustrated in FIG. 1, the strip-carrying dollies, such as the dolly 24', after being properly oriented with respect to each other, are placed into position relative to the frames 23 and 23', respectively, of the unit A. The dolly spools, such as spool 22', have wound thereon continuous breaker-strips R and R', respectively, which are reinforced internally by magnetically attractable metal (steel) cords. The respective liner take-up spools, such as the spool 22a', act to separate the liners from the continuous strips R and R', respectively. As the liners are separated from the strips, the strips R and R' are advanced by the respective conveyors 26 and 26' to unit B. The centering unit F ensures that the strips R and R' are fed to the unit B along their respective median planes A—A and B—B.

When the strips R and R' are at their respective centering units they are in a condition preparatory for being applied to their respective applicator wheels 28 and 28'. In order to permit building of a breaker-tread assembly of selected size, the diameter of the drum 130 is adjusted, within a range of, for example, 20–27 inches, and the position of the wheels 28 and 28' is correspondingly adjusted relative to the position of the periphery of the drum 130. In this respect, in order to effect a drum size change, the drum 130 by means of a manual push button associated with the drive means 134 and carriage 132 is axially shifted away from both of the wheels 28 and 28' to the position of the median plane C—C at the tread applicator assembly 200. It should be understood, that during the drum size change operation other cycles and operations of the machine are in an inactive condition. The thumb wheelswitch 308 (associated with the frame 34) is then manually adjusted for purposes of storing a selected reference count into the counter 306 (FIG. 13). The switching means 322 is then closed to effect movement of the frame 34, by means of the threaded shaft or screw 40, to a zero reference position. The zero reference postion corresponds to a lowermost position into which the frame 34 may be moved along a path 'L' (FIG. 2) passing through the axis of rotation of the wheel 28 and drum 130 and which is parallel to the axial extent of the screw 40. Movement of the frame 34 downwardly is terminated by a reference limit switch (not shown). A manually controlled push button (not shown) for raising the frame 34 from the lower zero reference point and which is associated with the motor 46 may then be activated. During movement of the frame 34 upwardly, the pulse generator 320 coupled with the frame drive screw 40 feeds pulses to the counter 306. As the counter 306 counts the pulses fed thereto, it approaches a count level corresponding to the reference count level stored therein by the thumb-wheel switch 308. When this count level is reached, by means of switching means (not shown) of conventional nature internally of the counter 306, the relay 312 which couples the counter 306 to the switch 310 acts to open the latter switch and thereby terminate power to the motor 46. Moreover, in order to ensure an immediate shutdown of the motor 46, the A.C. mechanical brake 324 is activated. It should be understood that the counter 306 upon reaching the accumulated reference count acts to signal same to the programmable controller (not shown) which in turn activates the A.C. friction brake 324.

The respective peripheries of the wheels 28 and 28' are now at a position wherein they correspond to the anticipated drum diameter size change to be effected. In this respect, the drum 130 is first collapsed to a reference level, for example a 20 inch diameter. This is done by manually activating a push button (not shown) which in turn through the relays and the like causes the brake shoe 184 (FIG. 9) to engage the brake wheel 182 upon the drum support shaft 150. This prevents the shaft 150 from rotating. The thumb-wheel switch 362 (FIG. 13) is then adjusted to reference the metering counter 360 for drum sizing. The counter 360 is referenced for drum sizing when the switch S-8 is closed such as by means of the programmable controller (not shown). The oscillator 366 in the interim is generating pulses to the gate 368. The metering counter 360, when signalled by the programmable controller, acts to open the gate 368 to allow the pulses generated by the oscillator 366 to pass through the gate 368. The programmable controller also acts to close the switch S-11 to permit the pulses passing through the gate 368 to reach the digital error register 370. When the prescribed quantity of pulses has been sensed by the metering counter 360, as referenced therein by the thumb-wheel switch 362, the counter 360 acts to close the gate 368.

In this manner, a prescribed quantity or "batch" of pulses is stored in the register 370. This batched quantity of pulses acts as a potential for effecting rotation of the drum drive shaft 144. In this respect, the digital pulses are converted to an analog signal by the converter 372 and then amplified by the regenerative SCR drive 373 to an appropriate level for driving the drum motor 136. This causes rotation of the drum drive shaft 144 and likewise the rotation of the cam plate 148 relative to the stationary drum support shaft 150. Rotation of the cam plate 148 causes the periphery-defining segments 166 to move radially outwardly.

As the drum drive shaft 144 rotates, the pulse generator 378 which is mechanically coupled with the shaft 144, through the intermediary of respective gears 390 and 392 (FIG. 9), acts to feed pulses back to the digital error register 370. The register 370 subtracts the pulses returned thereto by the pulse generator 378 from the batched quantity of pulses initially stored therein by the oscillator 366. As the quantity of pulses remaining in the register 370 approaches zero, the power of the signal to the converter 372 is reduced thereby slowing the rotation of the drum drive shaft 144 and cam plate 148. This slows the outward radial movement of the periphery-defining segments 166 and results in a precise termination of the movement of the latter wherein there is defined a selected drum diameter, for example 26 inches, when there are no longer any pulses remaining in the register 370. The periphery of the drum 130 may now be placed in operative registry with the surface of the wheel anvils, for example the magnetic anvil 29, or in effect spaced radially from the latter by a distance corresponding to approximately the thickness of the breaker strip R. The periphery of the drum 130 is radially spaced from the periphery of the anvil of the wheel 28' by a distance corresponding to twice the thickness of the breaker strip R or in effect the combined thickness of the breaker strip R and breaker strip R'.

In this manner, the size of the drum 130 can be precisely altered to a selected size within a prescribed range, and the frame 34 may be moved to a precise location relative to the drum 130 for purposes of ensuring that the periphery of the wheels 28 and 28' are in operative registry with that of the sized drum 130. Preferably, the pulse generator 320 which is associated with the frame drive screw 40 acts to return pulses to the counter 306 in a manner such that the pulses correspond to the number of inches that the frame 34 is to be shifted relative to the axis of rotation of the drum 130. On the other hand, the pulse generator 378, preferably, feeds pulses to the digital error register 370 in a manner such that the pulses correspond to the number of inches of drum diameter change effected.

When the drum 130 has been properly sized and the frame 34 has been positioned relative to the drum 130, the breaker building operation may proceed. In this respect, the wheel 28 must be jogged by means of the jog potentiometer 352 (FIG. 13) into a reference condition wherein the anvil 29 thereof is initially oriented relative to the breaker strip removal and restoring means 80 as illustrated in FIGS. 2 and 12A. However, the stripper plate 82 and magnetic plate 84 of the means 80 must first be lifted off the periphery of the anvil 29 so as to permit the wheel 28 to be so jogged and the breaker strip R to be accurately positioned upon magnetic surface of the anvil 29 wherein the leading edge of the breaker strip R is at a position slightly behind the leading edge of the anvil 29, or at a position corresponding to the triangular-like reference point P in FIG. 12A.

In order to lift the stripper and magnetic plates 82 and 84, respectively, off the surface of the anvil 29 the jacks 88 and 90 are actuated, either manually by push button means or by means of the programmable controller and associated relays (not shown). The plates 82 and 84 will then swing about their common axle 86 off the surface of the anvil 29. In the latter operation, the jacks 88 and 90 are actuated in unison, one superposed upon the other. The wheel 28 is then jogged to its reference position, and the breaker strip R is advanced onto the surface of the anvil 29 to the reference point P, the latter initially being done, for example, manually. Thereafter, however, the strip R is controlled completely automatically as will be described below.

In this respect, once the strip R has been properly positioned upon the surface of the anvil 29, the plates 82 and 84 are activated, and in unison pivotally swing downwardly into engagement with the strip R so as to constrain the latter in a fixed position relative to the anvil 29. The blades 74 and 76 of the strip severing means 68 are then activated, manually be push button means or by the programmable controller, and protracted so as to project through the center line of the strip R and into engagement with the anvil 29. The carriage sections 70 and 72 are then separated from one another by means of the jack 78 to effect severing of the breaker strip at an angle oblique to the circumferential center line of the wheel 28. The obliquity of the angle at which the breaker strip R is severed corresponds to that of the obliquity of the metal cords therein, or to that of the edge 94 of the plates 82 and 84. Once the breaker strip R has been severed such that it is presented with a leading edge of proper obliquity, the blades 74 and 76 are retracted out of contact with the anvil 29 and the carriage sections 70 and 72 are returned toward one another.

The plates 82 and 84 are then activated independently of one another, plate 84 before plate 82, and swing out of engagement with the strip R. The wheel 28 is, thereafter, jogged forwardly (clockwise) to the reference position illustrated in FIG. 12B. The leading edge of the strip R is now arcuately spaced from the reference point P by an extent corresponding to the circumferential size of the drum 130. The shot-pin 126 and its corresponding receptacle (not shown) in the wheel 28 are also in coaxial alignment. When the shot-pin 126 and its corresponding receptacle are coaxially aligned with one another, the wheel 28 is in one of its positions of "coincidence" corresponding to intelligence supplied by the thumb-wheel switch 335 (FIG. 13) associated with the count-down counter 330. The automated sequence of operations of the machine, as governed by the programmable controller, is now ready to proceed.

Accordingly, the programmable controller, by means of associated switches, contact closures and relays, activates the plates 82 and 84 such that the latter, in unison, swing into engagement with the strip R (FIG. 12C). The shot-pin 126 is energized (by the programmable controller) and locks the wheel 28 against rotation. The severing means 68 is then activated to obliquely sever a leading breaker ply B (breaker) from the strip R. Once the breaker B has been severed from the strip R the controller effects a reverse sequence. The severing means 68 is returned to a readied condition for a subsequent operation; the shot-pin 126 is disengaged from the wheel 28; and the plates 82 and 84, in unison, magnetically lift the trailing strip R off the magnetic surface of the anvil 29, the combined magnetic force of the elements 112 of the plate 84 being greater than the magnetic force of the anvil 29. Such a condition is illustrated in FIG. 12D. The wheel 28, when in the latter condition, is ready to transfer the breaker B to the drum 130.

However, prior to the rotation of the wheel 28 for the purposes of transferring the severed leading breaker B to the drum 130, the drum 130 must be indexed to a proper initial reference position wherein the drum spot magnets 167 are arcuately spaced from a mutual point of tangency (normal of the line 'L', FIG. 2) of the drum 130 and wheel 28 over a distance identical to the distance that the leading edge of the breaker B on the wheel 28 is spaced from the point of tangency. Indexing of the drum 130 to the latter initial reference position is effected by means of the thumb-wheel switch 364 (FIG. 13).

In this respect, the thumb-wheel switch 364 is manually set so as to store in the metering counter 360 a selected reference count. The controller than closes the switches S-10 and S-11, and the counter 360 opens the gate 368 briefly to permit a quantity of pulses, prescribed by the switch 364, to pass from the oscillator 366 into the digital error register 370. In this manner, a "batch" of pulses is stored in the register 370 which, when converted to an analog signal by the converter 372, causes the regenerative SCR drive 373 to rotate the motor 136 of the drum 130 and, thereby, effect rotation of the drum drive shaft 144.

The controller, however, first activates the brake shoe 184 (FIG. 9) such that the latter is moved out of contact with the brake wheel 182. The controller also activates the clutch 180 so that it is shifted into contact with the gear 176. Thus, when the drum drive shaft 144 is rotated, the drum support shaft 150 is likewise rotated. Rotation of the drum support shaft 150 is effected at a rate corresponding to the rate of rotation of the cam plate 148. Thus, the periphery-defining segments 166 are rotated in a fixed array relative to the axis of rotation of the drum 130 to permit movement of the drum spot magnets 167 first to a fixed inspection position and then to the initial reference position. Rotation of the drum 130 from the fixed inspection position to the initial reference position is precisely governed by the digital error register 370 which subtracts from the pulses "batched" therein the pulses fed thereto by the pulse generator 378 upon rotation of the drum drive shaft 144. Rotation of the drum 130 to the fixed inspection position may be effected, for example, by the forward and reverse jog potentiometers 374 and 375. After indexing of the drum 130, the controller opens the switches S-10 and S-11.

Once the drum 130 is indexed, the drum 130 and wheel 28 are activated to rotate in unison so as to permit transferring of the breaker B to the drum 130. Rotation of the wheel 28 and drum 130 in unison is controlled by the counter 330 (FIG. 13) and the tumbwheel switches 332-335. In this respect, the counter 330, which is a count-down type counter, is initially set with a prescribed reference count corresponding to the number of inches of the periphery of the wheel 28. Each of the thumb-wheel switches 332-335 is adapted to reference the counter 330 with intelligence to effect a particualr operation at selected intervals within one complete revolution of the wheel 28.

In this respect, the thumb-wheel switch 332 references the counter 330 to slow the rate of rotation of the wheel 28 just prior to movement of the stripper and magnetic plates 82 and 84 into contact with the anvil 29. The thumb-wheel switch 333 acts to reference the counter with intelligence to effect stopping of the wheel 28 at the precise point at which the stripper and magnetic plates 82 and 84 are to be brought into contact with the anvil 29 and, thereby, position on the latter the frontal portion of the unsevered breaker strip R. The thumb-wheel switch 334 acts to reference the counter with intelligence to effect a subsequent slow-down of the wheel 28 just prior to the anvil 29 being rotated into a position for permitting cutting of a leading breaker B from the breaker strip R. The thumb-wheel switch 335 references the counter 330 for purposes of effecting stopping of the wheel 28 at the precise position at which severing of a leading breaker B from the breaker strip R is to be effected. The latter position likewise corresponds to the point at which the shot-pin 126 is to be actuated by the programmable controller into locking contact with the wheel 28 for preventing rotation of the latter and for likewise indicating that the wheel 28 has been precisely revolved one full revolution.

Accordingly, assuming the wheel 28 is now in a position wherein the leading breaker B has been severed from the strip R, (FIG. 12D) and the spot magnets 167 on the drum 130 have been indexed to the aforementioned initial reference position, the controller closes the switches S-1 through S-4 associated with the thumb-wheel switches 332–335, respectively, all at once so as to permit the latter to reference the counter 330. The counter 330 through appropriate internal switching means (not shown) then closes the switch 339 associated with the run potentiometer 336 and opens the switch 340 associated with the creep potentiometer 337. This permits the voltage regulated SCR drive 342 to rapidly drive the motor 60 which in turn effects rotation of the wheel drive gear 64. The programmable controller, for example, also effects closure of the switch S-5 to permit power to be passed to the motor 60 and thereby to the wheel drive gear 64. The switch S-6 associated with the dynamic breaking circuit 350 is immediately opened when the switch S-5 is closed due to the provision of their common tie-member 351. The wheel 28 is, therefore, rotated at a rapid rate from a position illustrated in FIG. 12D to successive positions illustrated in FIGS. 12E and 12F.

The drum 130 is rotated in unison with the wheel 28 as the latter is driven by the voltage regulated SCR drive 342. This is effected by means of the digital error register 370 which is supplied with pulses from the pulse generator 346 associated with the wheel drive gear 64. In this respect, the pulse generator 346 not only feeds pulses to the counter 330 for indicating a precise location of the periphery of the wheel 28, but the pulse generator 346 also feeds pulses to the register 370 through the intermediary of the pulse divider 380 when the switch S-14 is in a closed condition as effected such as, for example, by the programmable controller.

The rate of division effected by the pulse divider 380 is such that it divides the greater number of pulses fed thereto by the pulse generator 346 to a level which corresponds to the rate of pulses fed to the digital error register by means of the pulse generator 378 associated with the drum drive shaft 144. Since the periphery of the wheel 28 is many times greater than the periphery of the drum 130, the rate of pulses from the generator 346 upon rotation of the wheel 28 is much greater than the rate of pulses from the pulse generator 378 upon rotation of the drum 130. The pulse divider 380 can be adjusted by means of the thumb-wheel switch 382 through the intermediary of the switches S-12 and S-13 which are keyed to the wheels 28 and 28', respectively.

As pulses are fed by the pulse generator 346 to the digital error register 370, the latter signals the converter 372 and regenerative SCR drive 373 to effect rotation of the motor 136 of the drum 130. Rotation of the drum 130 causes pulses to be fed by the pulse generator 378 likewise to the register 370. The pulses from the pulse generator 378 act to cancel or reduce an "error" sensed by the register 370. The "error" is the difference in pulses fed to the register 370 by the generator 346 (through the divider 380) and the generator 378. It is the initial input of pulses into the register 370 by the generator 346 which initiates the "error" and, thereby, effects rotation of the drum 130. However, as the "error" is reduced the surface speed of the drum 130 more closely corresponds to the surface speed of the wheel 28. Thus, the register 370 acts to precisely match the surface speed of the drum 130 with that of the surface speed of the wheel 28 and, thereby, effect precise transferring of the severed leading breaker B from the wheel 28 to around the periphery of the drum 130. If, during transferring of the leading breaker B, the surface speed of the wheel 28 and drum 130 vary relative to one another, the "error" in the register 370 will vary correspondingly, thereby, effecting a greater or lesser signal to the regenerative SCR drive 373 and an increase or decrease in the rate of rotation of the drum 130.

Accordingly, as the wheel 28 rotates rapidly, in a "run" condition, the leading breaker B is transferred to and around the drum 130. The spot magnets 167 of the drum 130 which are of greater strength than that of the magnetic surface of the anvil 29 permit separation and transferring of the breaker B from the wheel 28 to the drum 130. However, just prior to the wheel 28 reaching the position illustrated in FIG. 12-F wherein the breaker strip removal and restoring means 80, or plates 82 and 84, are to swing into contact with the anvil 29 and re-position the forward portion of the strip R onto the anvil 29, the counter 330, as referenced by the thumb-wheel switch 332, opens the switch 339 associated with the run potentiometer 336 and closes the switch 340 associated with the creep potentiometer 337. Opening and closing of the aforementioned switches 339 and 340 is effected through the intermediary of the conventional relay means 338 which is coupled with the counter 330 and the switches 339 and 340. The voltage regulated SCR drive 342 then drives the motor 60 and drum 130 at a reduced rate.

When the anvil 29 reaches the precise position illustrated in FIG. 12F, the counter 330, as referenced by the thumb-wheel switch 333, opens both of the switches 339 and 340 of the potentiometers 336 and 337, respectively. The programmable controller then opens the switch S-5, thereby, effecting closure of the switch S-6 to allow the resisterized dynamic braking circuit 350 to stop the motor. Moreover, the mechanical friction brake 348 is activated by the programmable controller to effect stopping of the motor 60. The plates 82 and 84 are then actuated in unison downwardly to carry the forward portion of the strip R into contact with the anvil 29, as illustrated in FIG. 12A. Then, by means of the programmable controller, the jack 90 of the magnetic plate 84 is actuated so as to swing the magnetic plate away from the stripper plate 82. The stripper plate 82 while remaining on the anvil 29 ensures that the strip R also remains upon the surface of the anvil 29. Subsequently, the jack 88 associated with the stripper plate 82 is actuated to separate the stripper plate from the strip R. The projection elements 104 and 122 of the plates 82 and 84, respectively, are associated with limit switches 105 and 123, respectively, for signalling the programmable controller the operative condition of the plates 82 and 84. It is in response to this intelligence that the controller effects continued rotation of the wheel 28.

After the plates 82 and 84 have been separated from the strip R, the programmable controller closes switch S-5, opens switch S-6, and signals the counter 330 to close the switch 339 associated with the run potentiometer 336 and, thereby, effect rapid rotation of the wheel 28. The wheel 28 is then rotated rapidly until it approaches a position as illustrated in FIG. 12B. As the wheel 28 approaches the position illustrated in FIG. 12B, which is slightly offset relative to the actual cut position at which the strip R is to be severed, the counter 330, as referenced by the thumb-wheel switch 334, will again effect a slowdown of the wheel 28.

The wheel 28 slows at this point and the counter 330, as referenced, either by means of the thumb-wheel switch 335 and its associated switch S-4 or by means of an internal switch in the counter (not shown), opens both of the switches 339 and 340, opens the switch S-5, and closes the switch S-6 to effect the dynamic breaking circuit 350. The controller then activates the A.C. friction brake 348 to assist in effecting a precise stopping of the motor 60 and, thereby, precise stopping of the wheel 28. The controller also activates the shot-pin 126 to lock the wheel 28. The stripper plate 82 by means of its jack 88 which is actuated by the programmable controller is then brought into contact with the strip R. Thereafter, the magnetic plate 84, through the intermediary of its jack 90, is brought into superposed relation upon the stripper plate 80 such that the permanent magnets 106 of the plate 84 project through corresponding ones of the apertures 96 in the stripper plate 82 and abut against the strip R. Thus, the plates 82 and 84 act to constrain the strip R in a temporarily fixed position upon the anvil 29 to permit the severing means 68 to again effect severing from the strip R of a further leading breaker B.

It should be understood that after one full revolution of the wheel 28, the counter 330 has counted down to a zero level. This necessitates resetting thereof to a prescribed upper count which will again subsequently correspond to a further one revolution of the wheel 28. Resetting of the counter 330 is effected by means of the reset limit switch 331 which is in a conventional manner associated with the shot-pin 216. When the shot-pin 126 is removed endwise from engagement with the wheel 28 to permit rotation of the latter from the position illustrated in FIG. 12D to the successive positions illustrated in FIGS. 12E and 12F, the reset limit switch 331 sets the counter 330 to its initial upper count level.

Once the drum 130 has been appropriately enwound with the leading breaker B, the lengthwise extent of which breaker B corresponds precisely to the circumference of the drum 130, the drum 130 is then axially shifted to the median plane B—B of the wheel 28', such as by means of its associated shift means 134 when activated manually by push button means or by the programmable controller. The sequence of operations of the wheel 28' corresponds to the sequence of operations of the aforementioned wheel 28. The one operation that is omitted with regard to the wheel 28' is that the drum 130 need not be indexed for purposes of moving the spot magnets 167 to reference location relative to the leading edge on a severed leading breaker upon the wheel 28'.

Once the leading breakers from the wheels 28 and 28' have been applied to the drum 130, the latter is again axially shifted to the tread applicator unit D such that the circumferential center line of the breaker assembly on the drum 130 corresponds to the median plane C—C of the tread applicator assembly 200. The tread applicator assembly is then activated and the gear 140 is decoupled by the clutch 138 from the drum motor 136 to bring the drum drive shaft 144 and, thereby, the drum 130 into a freely journalled condition. A tread T is then applied upon the built up breakers wound upon the drum 130 and a sequence of operations is effected such as illustrated in FIGS. 11A through 11E and discussed above. The tread T is selectively stretched or contracted so that its lengthwise extent precisely matches the outer circumference of the outer breaker mounted upon the drum 130. The assembly 200 is then upwardly tilted to move the leading edge of the tread T into contact with the outer breaker on the drum 130. The endless conveyor belts 308 of the assembly 200, thereafter, act to advance the tread T upon the exposed breaker on the drum 130 and, thereby, cause the drum 130 to revolve and be enwound with the tread T.

Once the tread T has been mounted and wound upon the exposed breaker, the drum 130 is then axially shifted to a position illustrated in phantom in FIG. 1 to the median plane D—D to permit the expansible, contractable, transfer ring 250 to grasp and transfer the built up breaker-tread assembly to the first stage carcass support assembly 260 wherein, in the manner discussed above, a first stage carcass and the breaker-tread assembly may be joined. In order to permit the transfer ring 250 to remove the breaker-tread assembly from the drum 130, the drum 130 must be collapsed slightly over a preferred extent. This may be effected by means of a thumb-wheel switch 363 (FIG. 13) which acts to reference the metering counter 360 through the intermediary of the switch S-9 when the latter is closed. The metering counter 360 will, thereby, permit the oscillator to pass a prescribed quantity of pulses through the gate 368 and into the digital error register 370.

The batch of pulses in the register 370 is then used for activating the regenerative SCR drive 373, the latter which drives the motor 136 and, thereby, the drum 130, in a reverse direction as effected by the programmable controller. However, in this instance the brake shoe 184 is again engaged with the brake wheel 182 to prevent the drum support shaft 150 from rotating. Thus, the cam plate 148 will rotate relative to the stationary support shaft 150 and, thereby, cause a collapsing of the drum 130 to a preferred extent. The extent of rotation of the cam plate 148 for collapsing the drum 130 is determined by the quantity of pulses batched into the register 370. When that quantity has been exhausted by the pulse generator 378 which feeds pulses to the register 370 as the cam plate 148 rotates, the drum 130 is collapsed over the preferred extent. The transfer ring 250 as contracted upon the built up breaker-tread assembly may then withdraw the latter from the periphery of the drum 130.

The drum 130 is then expanded once again to its preferred size in the exact same manner by which it was collapsed. In this respect, the thumb-wheel switch 363 again acts to reference the metering counter 360 which in turn permits a prescribed quantity of pulses to be batched into the register 370 by the oscillator 366. The regenerative SCR drive 373 then effects a forward rotation of the motor 136 and, thereby, a forward rotation of the cam plate 148. The forward rotation of the cam plate 148 results in an outward radial movement of the periphery-defining segments 166 and an expansion of the drum 130 to its preferred extent. The drum 130 is then shifted once again axially to a position opposite the wheel 28 so that the aforementioned further leading breaker B, severed from the strip R, can be wound upon the drum 130 for purposes of building second and successive breaker-tread assemblies.

Numerous alterations of the structure herein disclosed will suggest themselves to those skilled in the art. However, it is to be understood that the present disclosure relates to a preferred embodiment of the invention which is for purposes of illustration only and not to be construed as a limitation of the invention.

What is claimed is:

1. Apparatus for building a pneumatic tire, the apparatus comprising: a rotatably driven breaker building drum; at least one rotatably driven breaker applicator wheel spaced radially from and adjacent to said drum; breaker conveyor means for advancing a continuous breaker strip to and upon the periphery of said wheel; breaker strip severing means for severing from said breaker strip a leading breaker on said wheel to be transferred to said drum; electronic digital control means operatively coupled with said wheel and drum for rotatably indexing said wheel and drum to respective tangentially corresponding reference positions relative to one another at which transfer to said drum of a leading edge of said breaker on said wheel is to be initiated, said drum at its respective reference position including means thereon for effecting transfer of said leading breaker edge from said wheel to said drum, said control means including different drive means operatively associated with said wheel and drum respectively for rotating each simultaneously with one another after transfer of said leading breaker edge to said drum to complete the transfer of the entire breaker to said drum, one of said drive means being operatively associated with said drum for varying the rate of rotation thereof during breaker-transfer; and pulse-generating feed-back means operatively coupled with said wheel, said drum and said control means for relaying intelligence to said control means, via a continuous transmission of discrete pulses which are related to respective peripheral increments of said wheel and drum, firstly, prior to breaker-transfer, of the course and completion of indexing of said wheel and drum to their respective tangentially corresponding reference positions and secondly, during breaker-transfer, of the relative peripheral speeds of said wheel and drum so that said control means in response via pulse-rate comparison effects pulse-regulated variable rotation of said drum at a peripheral speed corresponding to the peripheral speed of said wheel.

2. Apparatus as claimed in claim 1, wherein said pulse-generating feed-back means includes switching means operatively associated with said wheel and drum, during breaker-transfer, for effecting rotation of said drum in direct response to the rotation of said wheel, whereby the rate of rotation of said wheel effects the rate of rotation of said drum only during breaker transfer.

3. Apparatus as claimed in claim 1 including means operatively coupled with said digital control means and said severing means for activating and deactivating the latter at predetermined intervals such that each leading breaker is cut-to-length on said wheel and presents an extent corresponding substantially to the circumferential extent of said drum.

4. Apparatus as claimed in claim 3 including stop means operatively associated with said wheel for stopping the rotation of the latter; and means operatively coupled with said digital control means and said stop means for activating and deactivating said stop means at said predetermined intervals to permit operation of said severing means.

5. Apparatus as claimed in claim 4 wherein said stop means includes, at least in part, an endwise displaceable position-referencing shot-pin operatively associated with, and offset relative to the axis of rotation of, said wheel, said wheel having a corresponding receptacle aligned axially with said shot-pin for reception of the latter.

6. Apparatus as claimed in claim 4 including breaker clamping means adjacent the periphery of said wheel for pressing a portion of said breaker strip against the periphery of said wheel during operation of said severing means; and means operatively coupled with said digital control means and said breaker clamping means for activating and deactivating said breaker clamping means at said predetermined intervals into and out of clamping association with said breaker strip.

7. Apparatus as claimed in claim 6 wherein said breaker clamping means includes an arcuate stripper plate and a conformingly arcuate magnetic plate displaceably superposed upon said stripper plate, said stripper and magnetic plates having a common axis of pivotal articulation to permit movement thereof into and out of pressing relation with said breaker strip and wheel, said magnetic plate including a plurality of magnetic elements extending from an underside thereof and confronting said stripper plate, said stripper plate having a plurality of corresponding apertures aligned with said magnetic elements for reception of the latter, said magnetic elements each having an endwise extent sufficient to project through the corresponding apertures in said stripper plate and terminate at least along an underside of said stripper plate which confronts said breaker strip.

8. Apparatus as claimed in claim 7 including first power means for articulating said stripper and magnetic plates toward and away from said wheel, independently of one another, one before the other; and second power means for articulating said stripper and magnetic plates toward and away from said wheel, in unison, one superposed upon the other.

9. Apparatus as claimed in claim 8 including means operatively coupled with said digital control means and said first power means for activating the latter, prior to the activation of said severing means, such that articulation of said stripper plate into pressing relation with said breaker strip precedes the articulation of said magnetic plate into pressing relation with the latter said strip, said strip having magnetically attractable steel-reinforcing cords therein.

10. Apparatus as claimed in claim 9 including means operatively coupled with said digital control means and said second power means for activating the latter, after said severing means severs said breaker strip, such that said stripper and magnetic plates are articulated in unison away from said wheel and magnetically lift a frontal portion of said breaker strip, behind the trailing edge of said breaker cut-to-length, off the periphery of said wheel.

11. Apparatus as claimed in claim 10 including means operatively coupled with said digital control means and said second power means for activating the latter, after transfer of said breaker cut-to-length to said drum, such that said stripper and magnetic plates are articulated in unison toward said wheel and restore said frontal portion of said breaker strip onto the periphery of said wheel.

12. Apparatus as claimed in claim 11 including means operatively coupled with said digital control means and said first power means for activating the latter, after said frontal portion of said breaker strip has been restored onto the periphery of said wheel, such that articulation of said magnetic plate away from said frontal portion of said breaker strip precedes articulation of said stripper plate out of pressing relation with said strip, said stripper plate thereby permitting said magnetic plate to be separated from said strip such that the latter remains on the periphery of said wheel.

13. Apparatus as claimed in claim 12 wherein at least a portion of the periphery of said wheel includes magnetic elements, said magnetic elements of said wheel having a combined magnetic force of lesser magnitude than the combined magnetic force of the magnetic elements on said magnetic plate.

14. Apparatus as claimed in claim 13 wherein said wheel includes a breaker support band extending peripherally therealong over an arcuate extent of substantially 180°, said breaker support band constituting that portion of the periphery of said wheel which contacts and supports said breaker strip.

15. Apparatus as claimed in claim 1 wherein said drum includes a substantially linear array of magnetic elements extending along the periphery thereof in a direction generally endwise of said drum which corresponds to an angle of inclination presented by the leading edge of each said breaker cut-to-length.

16. Apparatus as claimed in claim 15 wherein said digital control means includes means operatively coupled with said wheel and drum for indexing said drum relative to said wheel, prior to transferring of a breaker cut-to-length from said wheel to said drum and while said wheel is stationary, such that said linear array of magnetic elements on said drum and said leading edge of said breaker cut-to-length on said wheel will thereafter be rotated into direct alignment and contact with one another.

17. Apparatus as claimed in claim 5 wherein said breaker clamping means includes breaker strip lift means for lifting a frontal portion of said breaker strip, which is directly behind the trailing edge of a leading breaker cut-to-length, off the periphery of said wheel to permit further rotation of said wheel into breaker-transferring relation with said drum; and including means operatively coupled with said digital control means and said breaker strip lift means for activating the latter at further predetermined intervals to restore said frontal portion of the latter said breaker strip upon the periphery of said wheel after the transferring operation of the latter said breaker cut-to-length to said drum; and means operatively coupled with said digital control means and said wheel for effecting stopping of the rotation of the latter at said further predetermined intervals such that said breaker strip lift means timely restores the latter said breaker strip onto a preselected location on the periphery of said wheel.

18. Apparatus as claimed in claim 17 wherein said digital control means includes means operatively coupled with said wheel for effecting rotation of the latter at a rapid rate over a period between a breaker strip severing operation and a subsequent breaker strip restoring operation in which a frontal portion of the breaker strip is restored upon the periphery of said wheel, and again at a rapid rate over a reduced period after said subsequent breaker strip restoring operation and until a further breaker strip severing operation is to be effected; and means for effecting a reduction in the rate of rotation of said wheel just prior to stopping of said wheel at each said breaker strip severing operation and at each said breaker strip restoring operation.

19. Apparatus as claimed in claim 1 wherein said drum includes a plurality of circumferentially adjacent, radially shiftable, periphery-defining members; digital digital-control-means-governed drum-sizing means for shifting said members selectively toward and away from the axis of rotation of said drum; said periphery-defining members when shifted away from the axis of rotation of said drum cooperatively defining a breaker-building periphery of increased circumferential extent, and when shifted toward the axis of rotation of said drum said members cooperatively define a breaker-building periphery of decreased circumferential extent.

20. Apparatus as claimed in claim 19 wherein said drum-sizing means includes a camming member, each of said periphery-defining members including a respective follower operatively associated with, and shiftably responsive to, said camming member.

21. Apparatus as claimed in claim 20 wherein said camming member is provided with a groove of substantially spiral extent in which a portion of each said follower is slidably constrained.

22. Apparatus as claimed in claim 21 wherein said drum includes a substantially cylindrical wall internally of which is disposed said camming member for rotation relative thereto, said cylindrical wall having a plurality of circumferentially spaced slots through which slidably project said followers, respectively.

23. Apparatus as claimed in claim 22 including rotary drive means for rotating said camming member and said cylindrical wall relative to one another to effect, selectively, an increase or decrease in the circumferential extent of said drum; and coupling means for coupling said cylindrical wall and camming member to one another such that each rotates in unison with the other during transfer of a leading breaker to said drum from said wheel.

24. Apparatus as claimed in claim 19 wherein said drum-sizing means is operatively coupled with said digital control means and said drum for effecting a selective increase or decrease in the circumferential extent of the latter; and including digitally controlled wheel-shifting means operatively coupled with said wheel for effecting radial shifting of the latter relative to the axis of rotation of said drum over an extent corresponding to a change in drum size.

25. Apparatus as claimed in claim 1 including tread-conveyor means spaced radially adjacent said drum for advancing a tread to and around said drum, said tread-conveyor means including measuring means for determining the longitudinal extent of an advancing tread; and tread-sizing means, responsive to said measuring means, for stretching or contracting selectively the longitudinal extent of the advancing tread such that the longitudinal extent of the latter is substantially identical to the circumferential extent of an exposed breaker wound around said drum.

26. Apparatus as claimed in claim 25 including means for moving said tread-conveyor means into operative registry with said drum such that a leading edge portion of the advancing tread initially engages said exposed breaker wound around said drum.

27. Apparatus as claimed in claim 26 including means for decoupling said drum from a rotary drive therefor such that said drum is brought into a freely journaled condition, said tread-conveyor means when in said operative registry with said drum acting to advance the latter said tread onto the exposed breaker and effect rotation of said drum.

28. Apparatus as claimed in claim 25 wherein said tread-sizing means includes a plurality of plates which are spring loaded for selective movement both in a direction with and, opposite to, the direction of advancement of said tread; means for shifting said plates into and out of pressing engagement with, and normally of, one surface of said advancing tread; means cooperating with said plates for contacting an opposite surface of the advancing tread when said plates are in pressing association with the latter said tread; and means for selectively shifting said plates in a direction with, or opposite to, the direction of advancement of the latter said tread to contract or stretch the latter selectively.

29. Apparatus as claimed in claim 2 wherein said pulse generating feed-back means includes a first pulse generator operatively coupled with said drum; and a second pulse generator operatively coupled with said wheel, said digital control means including pulse detecting means coupled with both said first and second pulse generators for comparing the rate of pulses returned thereto by both said first and second pulse generators; and pulse conversion means responsive to said pulse detecting means for effecting a change in the rate of rotation of said drum to match the peripheral speed of said wheel when the rate of pulses returned from said first pulse generator differs from the rate of pulses returned from said second pulse generator.

30. Apparatus as claimed in claim 29 wherein said pulse detecting means includes a digital error register and said pulse conversion means includes a digital-to-analog converter electrically coupled with said register.

31. Apparatus as claimed in claim 30 wherein said first pulse generator is electrically coupled with said register, and including a pulse divider interposed between and electrically intercoupling said second pulse generator and said register.

32. Apparatus as claimed in claim 30 including regenerative SCR drive means interposed between and electrically intercoupling said drum and said converter.

33. Apparatus as claimed in claim 29 wherein said digital control means further includes an adjustable pulse counter and voltage regulated SCR drive means electrically coupled with one another and both interposed between said second pulse geneator and said wheel.

34. Apparatus for building a pneumatic tire, the apparatus comprising: a rotatably driven breaker building drum; at least one rotatably driven breaker applicator wheel spaced radially from and adjacent to said drum, said drum and wheel being operatively associated with one another for effecting a transfer of a breaker from said wheel to and around said drum, said drum including a plurality of circumfernetially adjacent, radially shiftable, periphery-defining members; drum-sizing means for radially shifting said members selectively toward and away from the axis of rotation of said drum, said members when shifted away from the axis of rotation of said drum cooperatively defining a breaker building periphery of increased circumferential extent, said members when shifted toward the axis of rotation of said drum cooperatively defining a breaker building periphery of decreased circumferential extent; and electronic digital control means operatively coupled with said drum-sizing means and said wheel for both indexing a change in the circumferential extent of said drum and a corresponding displacement of said wheel radially relative to the axis of rotation of said drum such that the respective peripheries of said wheel and drum are moved into operative breaker-transferring registry with one another.

35. Apparatus as claimed in claim 34 including pulse generating feed-back means operatively coupled with said drum-sizing means and said digital control means for relaying to the latter drum-size condition intelligence; and selection means for storing in said digital control means a selected drum-size reference with which said digital control means compares drum-size condition intelligence relayed thereto for effecting a drum size change.

36. Apparatus as claimed in claim 35 wherein said digital control means includes a first digital control system with which is operatively coupled said pulse generating feedback means and selection means; a second digital control system operatively coupled with said wheel; a further pulse generating feedback means operatively coupled with said wheel and said second digital control system for relaying to the latter intelligence corresponding to shifting of said wheel radially relative to the axis of rotation of said drum; and further selection means for storing in said second digital control system a selected wheel-shift reference, corresponding to a selected drum size change, with which said second digital control system compares wheel-shifting intelligence relayed thereto for effecting a shift of said wheel over a selected extent.

37. Apparatus as claimed in claim 36 wherein said drum-sizing means includes a camming member, each of said periphery-defining members including a respective follower operatively asociated with, and shiftably responsive to, said camming member.

38. Apparatus as claimed in claim 37 wherein said camming member is provided with a groove of substantially spiral extent in which a portion of each said follower is slidably constrained.

39. Apparatus as claimed in claim 38 wherein said drum includes a substantially cylindrical wall internally of which is disposed said camming member for rotation relative thereto, said cylindrical wall having a plurality of circumferentially spaced slots through which slidably project said followers, respectively.

40. Apparatus as claimed in claim 39 including rotary drive means for rotating said camming member and said cylindrical wall relative to one another to effect, selectively, an increase or decrease in the circumferential extent of said drum; and coupling means for coupling said cylindrical wall and camming member to one another such that each rotates in unison with the other during transfer of a leading breaker to said drum from said wheel.

41. Apparatus as claimed in claim 40 wherein said rotary drive means is operatively coupled to said first digital control system to be deactivated by the latter during a drum size change when the selected drum size is reached.

42. Apparatus as claimed in claim 36 including a frame upon which said wheel is supported, and drive means for shifting said frame radially relative to the axis of rotation of said drum, said second digital control system being operatively coupled with said drive means for deactivating the latter when said frame and thereby said wheel has been shifted over said selected extent.

43. Apparatus as claimed in claim 34 wherein said electronic digital control means includes a pulse generating oscillator; a digital error register; a gate electrically intercoupling said register and oscillator; adjustable metering counter means electrically coupled with said oscillator and said gate for opening the latter and permitting a selected quantity of pulses to be batched into said register; and a pulse generator interposed between said drum and register and electrically coupled to the latter.

44. Apparatus as claimed in claim 34 wherein said digital control means further includes movable means for supporting said wheel adjacent said drum, a pulse generator operatively associated with the latter said movable means, switching and drive means for effecting movement of said movable means, and an adjustable pulse counter interposed between and operatively associated with said switching means and said pulse generator.

45. Apparatus for building a pneumatic tire, the apparatus comprising a rotatably driven breaker building drum; at least one rotatably driven breaker applicator wheel spaced radially from and adjacent to said drum; breaker conveyor means for advancing a continuous magnetically-responsive breaker strip to and upon the periphery of said wheel; breaker strip severing means for severing from said breaker strip a leading breaker on said wheel to be transferred to said drum; and breaker strip clamping means for (a) clamping said strip against said wheel during severing from said strip of said leading breaker and (b) lifting a portion of said strip trailing the severed leading breaker off the periphery of said wheel to permit rotation of the latter and transferring of said leading breaker to said drum, said breaker strip clamping means including an arcuate stripper plate and a conformingly arcuate magnetic plate displaceably superposed upon said stripper plate, said stripper and magnetic plate having a common axis of pivotal articulation adjacent the periphery of said wheel to permit movement of said plates into and out of pressing relation with said breaker strip and wheel, said magnetic plate including a plurality of magnetic elements extending from an underside thereof and confronting said stripper plate, said stripper plate having a plurality of corresponding apertures aligned with said magnetic elements for reception of the latter, said magnetic elements each having an endwise extent sufficient to project through the corresponding apertures in said stripper plate and terminate at least along an underside of said stripper plate which confronts said breaker strip.

46. Apparatus for building a pneumatic tire, the apparatus comprising: a rotatably driven breaker building drum; at least one rotatably driven breaker applicator wheel spaced radially from and adjacent to said drum; breaker conveyor means for advancing a continuous breaker strip to and upon the periphery of said wheel; breaker strip severing means for severing from said breaker strip a leading breaker on said wheel to be transferred to said drum; electronic digital control means operatively coupled with said wheel and drum for rotating said wheel and drum simultaneously, said drum including means thereon for effecting transfer of said leading breaker from said wheel to said drum when said wheel and drum are rotated simultaneously, said control means being operatively associated with said drum for varying the rate of rotation thereof; and pulse-generating feed-back means operatively coupled with said wheel, said drum and said control means for relaying intelligence, via a continuous transmission of discrete pulses which are related to respective peripheral increments of said wheel and drum by the time period between pulses, of the relative peripheral speeds of said wheel and drum so that said control means in response via pulse-rate comparison effects pulse-regulated variable rotation of said drum at a peripheral speed corresponding to the peripheral speed of said wheel.

* * * * *

PO-1050
(5/69)

UNITED STATES PATENT OFFICE
CERTIFICATE OF CORRECTION

Patent No. 3,844,871  Dated October 29, 1974

Inventor(s) William C. Habert et al.

It is certified that error appears in the above-identified patent and that said Letters Patent are hereby corrected as shown below:

Column 28, line 1, "claim 5" should read --claim 6--.

Column 28, line 37, "digital" should read --and--.

Column 30, line 25, "circumfernetially" should read --circumferentially--.

Signed and Sealed this eighteenth Day of May 1976

[SEAL]

Attest:

RUTH C. MASON
*Attesting Officer*

C. MARSHALL DANN
*Commissioner of Patents and Trademarks*